US012783525B1

(12) United States Patent
Chawla et al.

(10) Patent No.: US 12,783,525 B1
(45) Date of Patent: *Nov. 3, 2026

(54) ENHANCED RETRIEVAL-AUGMENTED GENERATION FOR STRUCTURED TABULAR DATA

(71) Applicant: Airia LLC, Alpharetta, GA (US)

(72) Inventors: Ravish Chawla, Atlanta, GA (US); Ihor Herasko, Sofia (BG); Ventsislav Potchekanski, Sofia (BG); Martin Tsekov, Sofia (BG)

(73) Assignee: Airia LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/424,786

(22) Filed: Dec. 18, 2025

Related U.S. Application Data

(63) Continuation of application No. 19/273,063, filed on Jul. 17, 2025, now Pat. No. 12,524,412.

(51) Int. Cl.
*G06F 16/23* (2019.01)
*G06F 16/2455* (2019.01)

(52) U.S. Cl.
CPC ................................ *G06F 16/2456* (2019.01)

(58) Field of Classification Search
CPC .................................................. G06F 16/2456
See application file for complete search history.

(56) References Cited

U.S. PATENT DOCUMENTS 8,923,812 B1 * 12/2014 Koum ............... H04M 3/42306 455/410
9,311,375 B1 * 4/2016 Naik ..................... G06F 16/275
9,778,946 B2 * 10/2017 Naik ..................... G06F 16/128
11,088,916 B1 * 8/2021 Chandrashekhar .......................... G06F 11/3409
2008/0162590 A1 * 7/2008 Kundu ................ G06F 11/1662
2014/0149357 A1 * 5/2014 Gupta ................. G06F 16/2308 707/652
2015/0310026 A1 * 10/2015 Chen ....................... H04L 67/52 707/782
2016/0217042 A1 * 7/2016 Wang .................. G06F 11/1469
2016/0283335 A1 * 9/2016 Yao ......................... G06F 16/27
2016/0381184 A1 * 12/2016 Small ...................... G06F 16/23 709/203
2017/0215052 A1 * 7/2017 Koum ..................... H04W 4/18
2020/0034471 A1 * 1/2020 Danilov .............. G06F 16/2246
2023/0121460 A1 * 4/2023 Banerjee ................ G06F 16/27 707/812

* cited by examiner

*Primary Examiner* — Eliyah S. Harper

(57) ABSTRACT

Retrieval of structured tabular data in a retrieval-augmented generation (RAG) platform is described. An example method includes extracting metadata from a tabular file comprising structured data, the metadata comprising short metadata and long metadata, generating, for the tabular file, a dataset agent object using the metadata, receiving a natural language query through a query agent object, identifying the dataset agent object using a metadata filtering rule based at least in part on the natural language query and the short metadata, generating a structured query based on the natural language query and the long metadata, the structured query conforming to structured query language syntax and comprising query constraints derived from the short metadata, and executing the structured query on the structured data associated with the dataset agent object.

20 Claims, 11 Drawing Sheets

ENHANCED RETRIEVAL-AUGMENTED GENERATION FOR STRUCTURED TABULAR DATA

CROSS-REFERENCE TO RELATED APPLICATIONS

This application is a continuation of U.S. Non-Provisional application Ser. No. 19/273,063, titled "ENHANCED RETRIEVAL-AUGMENTED GENERATION FOR STRUCTURED TABULAR DATA," filed Jul. 17, 2025, the entire contents of which is hereby incorporated herein by reference.

BACKGROUND

With the widespread adoption of artificial intelligence (AI) and machine learning (ML) technologies across various industries, it has been challenging to retrieve and process the data stored in the wide range of structured data sources available to such systems. Traditional retrieval-augmented generation (RAG) techniques used in AI and ML systems can enhance the performance of large language models (LLMs) by facilitating access to external knowledge sources when generating text responses. RAG techniques permit LLMs and related models to retrieve and use relevant information from external databases or knowledge bases, improving accuracy, relevance, and depth of knowledge in generated responses in some cases. RAG techniques primarily employ vectorization and embedding-based approaches trained on unstructured corpora. However, RAG techniques and systems are not necessarily optimized for use with, and can be suboptimal for use with, data that is organized, managed, or structured in other formats.

SUMMARY

A computer-implemented method is disclosed for retrieving structured data within a structured retrieval-augmented generation (RAG) platform. The method includes receiving a tabular file including structured data, and extracting metadata from the tabular file, including both short metadata and long metadata. The short metadata can include schema-level information such as file name, table label, and column headers, while the long metadata can include semantic and statistical characteristics such as data types, nullability, enumerated values, minimum and maximum values, row-level security attributes, and inferred relationships.

Based on the extracted metadata, a dataset agent object is generated. This object represents the ingested structured data and encapsulates associated metadata for semantic alignment. A language model prompt can be applied to the structured data to generate a human-readable, natural language description summarizing the contents of the dataset. The dataset agent object and associated metadata are stored in a metadata index, which associates agent objects with unique identifiers and access control policies and supports downstream metadata-driven operations.

The method further includes receiving a natural language query through a query agent object presented within a workflow canvas. The workflow canvas provides a graphical interface including multiple interconnected agent objects that collectively define a data transformation or interaction workflow. To process the query, the system identifies a relevant dataset agent object by applying a metadata filtering rule based at least in part on the natural language query and the short metadata. The rule can include a semantic similarity comparison between query terms and column headers, and can involve scoring multiple agent objects based on semantic alignment and selecting the best match.

Once a relevant dataset agent object is identified, the system retrieves long metadata and constructs a prompt combining the query of the user with metadata context. A large language model, optionally fine-tuned for structured query generation based on metadata inputs, generates a structured query such as an SQL statement. The structured query conforms to the syntax and functional constraints of a target database type, can include column aliases derived from the metadata, and is configured for compatibility with the underlying dataset structure.

The structured query is executed against the data represented by the dataset agent object. Execution can be performed by a query service and return a structured response, such as via a standardized API interface. In some cases, the execution includes join operations across datasets represented by multiple agent objects, based on metadata relationships stored in the index. The system generates a response including the result set and the identifier of the dataset agent object used, optionally including metadata fields such as execution time and number of rows returned. A natural language explanation of the query may also be generated for display.

The response is then routed to a downstream agent object within the workflow canvas. Downstream agent objects can include a visualization tool, document generator, export utility, or other workflow-integrated components. The overall system supports rich orchestration of data operations through visual agent composition and semantic query interaction, enhancing accessibility for non-technical users.

In some implementations, each worksheet of a multi-sheet spreadsheet is treated as a separate dataset agent object. The method can also include resolving synonym mappings between query terms and column names. The described features can be implemented as a computer system including processors and memory configured to perform the disclosed operations, or as instructions stored on a non-transitory computer-readable medium.

This summary is provided to introduce selected concepts that are further described in the detailed description. It is not intended to identify key or essential features of the claimed subject matter, nor to limit the scope of the claims.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
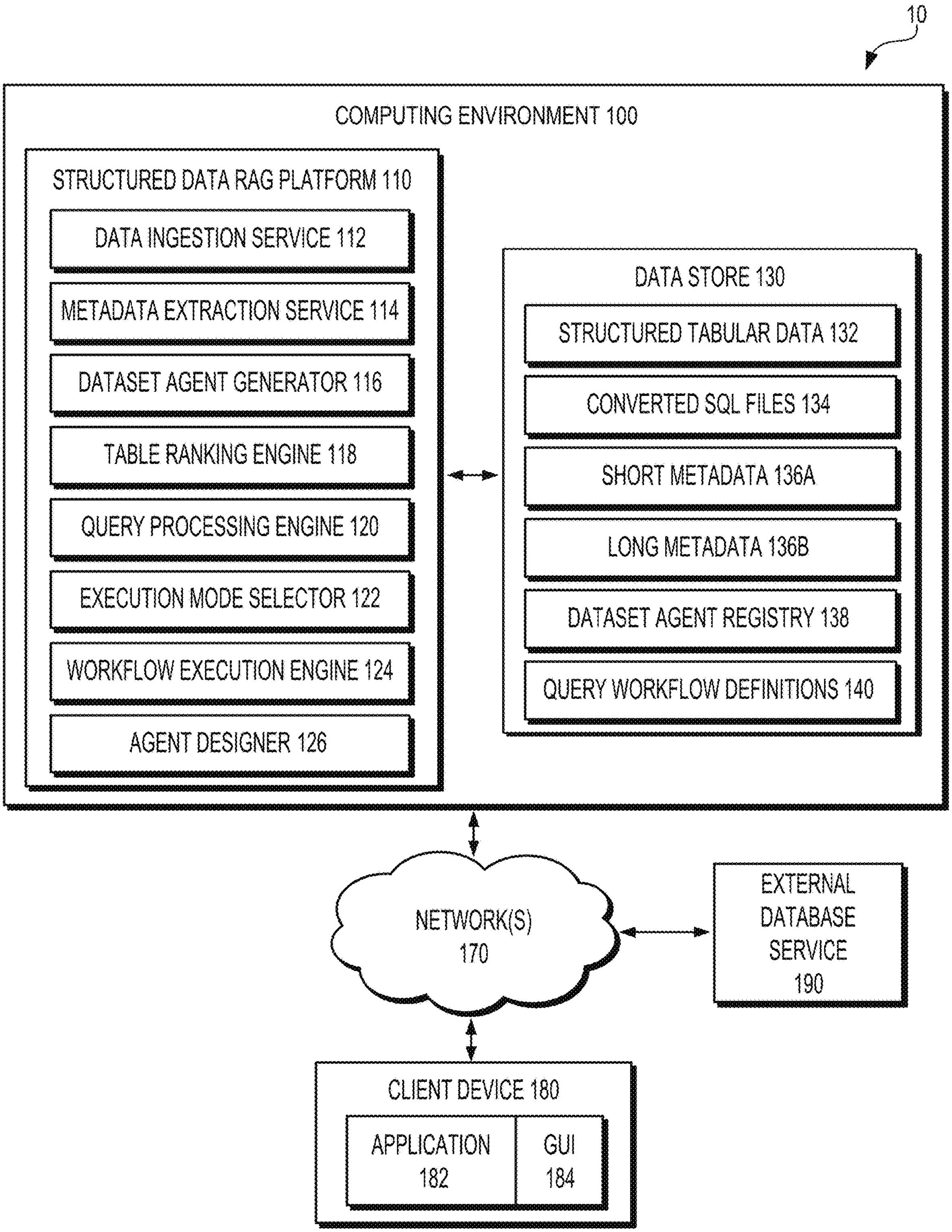
FIG. 1 depicts an example networked operating environment for the ingestion, registration, and querying of structured tabular data by an enhanced structured data retrieval-augmented generation (RAG) platform according to an example implementation.

The widespread adoption of artificial intelligence (AI) and machine learning (ML) technologies across various industries has encountered challenges in processing and retrieving information from structured data sources. Traditional retrieval-augmented generation (RAG) techniques and systems primarily employ vectorization and embedding-based approaches trained on unstructured corpora. However, when RAG techniques and systems are applied to structured tabular data, such as Comma Separated Values (CSV) files or spreadsheets containing numerical and categorical information, the RAG techniques may be suboptimal.

Structured tabular data submitted to AI platforms often contains thousands to hundreds of thousands of rows. Chunk-based retrieval methods can be ineffective at this scale. Large files frequently exceed the context window of typical language models, and chunk-based retrieval methods that rely on predefined segmentation may fail to consistently capture relevant data. Moreover, numerical values lack the semantic features of natural language text, complicating effective embedding and retrieval.

Further, converting tabular data into flattened textual representations often fails to preserve structural context. Some RAG systems attempt to process tabular data by converting the tabular data into linearized text chunks or embedding entire rows. This strategy often results in the loss of relational structure, such as inter-column relationships, data types, and referential integrity, which are critical for meaningful interpretation of structured data. Such systems also struggle to support queries involving aggregations, type-based filtering, or analytical operations that are common in structured query language (SQL) workflows.

Additional complications can arise when structured data spans multiple files that analyzed collectively. These files may include cross-references that may require join operations to preserve semantic context. Conventional RAG pipelines typically lack robust mechanisms for preserving cross-file relationships and ensuring referential integrity, especially during ingestion and querying stages.

Users also benefit from human-readable summaries and metadata to understand table structures and relationships. However, existing systems often fail to generate meaningful metadata such as data types, statistical summaries, null distributions, and cross-table relationships. The absence of intuitive metadata extraction and indexing can limit the ability for users to navigate and interpret large, structured datasets.

In addition to structural challenges, approximate matching and fuzzy search capabilities are also limited in current systems. Users may submit natural language queries that contain misspellings (e.g., "revenew" instead of "revenue"), synonyms (e.g., "cost" instead of "expense"), or partial matches (e.g., truncated column names). Systems relying on exact-match database logic or conventional vectorization methods may miss relevant results in such scenarios, limiting overall retrieval effectiveness.

Moreover, many solutions require complex preprocessing or data transformation pipelines before ingestion. Structured files like CSVs and spreadsheets often require manual schema definition or data normalization, increasing adoption barriers. As a result, the ability to perform natural language queries over structured datasets remains constrained by the rigidity of current preprocessing and retrieval methods.

Examples of enhanced RAG systems for processing structured tabular data, among other types of data structures, are described herein. The systems and methods disclosed herein extend conventional RAG architectures by enabling ingestion, indexing, and querying of structured datasets, such as CSV files, spreadsheets, and relational database tables, using natural language queries. The systems support metadata-driven data ingestion, semantic filtering of relevant tables, generation of structured queries, and return of query result sets along with traceable metadata to aid in explanation and debugging. These capabilities enable scalable, explainable, and interactive data exploration across large collections of tabular information.

In one implementation, tabular datasets are processed to extract short and long metadata (e.g., concise summaries and more extensive statistical and structural descriptors), which are then used to construct dataset agent objects. These objects are registered with the system and are indexed for semantic matching during runtime. Natural language queries are ingested via a query agent rendered within a graphical canvas, where query processing includes metadata filtering and large language model-driven generation of structured queries (e.g., SQL statements). The resulting queries are executed against the corresponding dataset agent, and the outputs are returned along with metadata identifiers. Users can visually author and test query workflows using a no-code or low-code interface.

The enhanced RAG systems and methods described herein offer several technical advantages, such as native support for structured data sources without requiring manual transformation or schema engineering, metadata-aware indexing that improves retrieval precision, intelligent parsing of numerical and categorical fields, and support for cross-table joins and referential integrity. The systems also support fuzzy matching and semantic disambiguation for natural language queries, enabling robust querying even when user terminology varies or includes synonyms. Moreover, the graphical workflow construction and modular agent-based design allows domain experts and analysts to interact with structured data in a more intuitive way. In addition, declarative filtering rules, contextual metadata enrichment, and integration with access policies further support enterprise deployment and auditability.

FIG. 1 depicts an example networked operating environment 10 (also "environment 10") for the ingestion, registration, querying, and execution of structured tabular data by an enhanced structured data RAG platform according to an example implementation. The environment 10 includes a computing environment 100, a network 170, a client device 180, and an external database service 190 in the example depicted. These and other components of the environment 10 are described in additional detail below. The environment 10 is illustrated as a representative example of a networked system of computing devices and services capable of processing structured datasets, such as CSV or spreadsheet files, by extracting semantic metadata, generating dataset agent objects, and executing large language model (LLM)-based queries in a workflow orchestrated through modular agents. The devices and services in the environment 10 can be deployed in a variety of physical and logical configurations, including centralized cloud deployments, decentralized edge environments, or hybrid models. While FIG. 1 depicts representative components, the environment 10 can include additional computing infrastructure not explicitly shown, such as backend servers, distributed file storage systems, metadata indexing services, monitoring layers, internet-of-things (IoT) devices, or specialized client applications. In some deployments, one or more of the depicted components can be omitted or combined depending on system configuration.

Among other components, the computing environment 100 includes a data store 130 and a structured data RAG platform 110. Examples of the types of structured tabular data and metadata stored in the data store 130 and the operational components of the structured data RAG platform 110 are described in further detail below. At the physical layer, the computing environment 100 can be embodied as one or more computing devices, including processing circuitry, memory, and network interfaces (e.g., rack servers). The computing environment 100 can be hosted in various deployment models. As examples, the computing environment 100 can be hosted as a multi-tenant public cloud environment, hosted as an off-premises private or dedicated cloud environment, hosted as an on-premises private cloud environment, or some hybrid combination thereof. These and other deployment options are described below reference to FIG. 11.

The computing environment 100 can be embodied as physical servers communicatively coupled together by a computer network, including the network 170. The servers or other computing devices of the computing environment 100 can be hosted at one or more geographic locations, including on- and off-premises locations and combinations thereof. The computing environment 100 can be embodied as an elastic or scalable computing environment in some cases. The servers of the computing environment 100 can execute a hypervisor layer, an orchestration layer, and other executable layers for logically organizing the underlying hardware of the servers into virtual instances. The partitions of the hardware can be organized into any number of private partitions (e.g., private cloud partitions), public partitions (e.g., public cloud partitions), and hybrid public/private partitions to support the services provided by the structured data RAG platform 110 for different users, parties, or organizations. Some components of the computing environment 100 can be implemented, at least in part, as functional or logical modules through the execution of computer-readable instructions, which can be stored on the computing environment 100 and other locations in the environment 10. Examples of functional or logical modules are described below, and additional aspects of the hardware and software layers of the computing environment 100 are also described below.

The network 170 can include the Internet, intranets, extranets, wide area networks (WANs), local area networks (LANs), wired networks (e.g., copper, fiber-optic, etc.), wireless (e.g., radio frequency (RF)) networks, and related computer networks, and combinations thereof. The network 170 can include a combination of network interface adapters, switches, routers, access points, and other network-related hardware devices with processing and memory resources. The network 170 can include a combination of public networks, private networks, virtual public networks, virtual private networks, and other types of networks. The computing environment 100, the client device 180, the external database service 190, and other network host computing systems and devices in the environment 10 can communicate data among each other over the network 170. Data can be communicated over the network 170 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and other protocols and interconnect frameworks without limitation.

The client device 180 is representative of one or more end-user client devices. The client device 180 can be embodied as a range of different computing devices, such as a desktop computer (e.g., Windows®, macOS®, Linux® workstations), a laptop computer, a notebook or tablet computer (e.g., iPad® or Android® tablet), a dedicated terminal or thin client, an IoT device, a personal digital assistant, a smart phone (e.g., iOS®, Android®, related mobile device), a wearable computing device (e.g., smartwatch, augmented reality headset, virtual reality headset, etc.), a consumer electronic device (e.g., smart television, game console, streaming device), an embedded control system, a command-line interface device, a terminal-based system, a virtual desktop infrastructure (VDI), an edge computing node, or related computing devices or combinations thereof. The client device 180 can include peripheral devices or components, such as display interfaces and input/output devices. The client device 180 can be relied upon to interface with the computing environment 100 for the configuration, submission, querying, and review of structured tabular datasets using the enhanced RAG platform described herein.

The client device 180 can execute an application 182, which is representative of one or more applications, application extensions, or other application-related components that can be executed on the client device 180. The application 182 can include hypertext-based network browsers, such as, but not limited to, Internet Explorer®, Firefox®, Chrome®, Safari®, or Silk® browsers, among other types of browsers. Alternatively, the application 182 can be embodied as other types of applications, such as e-mail clients, messaging clients, document editors or viewers, file browsers, or other applications or application extensions for other purposes. As described below, the application 182 can be embodied as a hypertext-based network browser in at least one example, and the application 182 can generate a graphical user interface (GUI) 184 in connection with the structured data RAG platform 110. A user of the client device 180 can view extracted metadata, register dataset agents, and issue structured or natural language queries using the GUI 184, as described below.

According to aspects of the implementations, the structured data RAG platform 110 of the computing environment 100 enables the ingestion, metadata extraction, dataset agent generation, registration, and querying of structured tabular data using a graphical user interface accessible on the client device 180. The structured data RAG platform 110 facilitates the registration of dataset agent objects, which represent ingested and semantically annotated structured datasets, and their use in structured data query workflows instantiated within a low-code/no-code environment. The structured data RAG platform 110 also enables the configuration, execution, and visualization of query results over these agent-based structures. The platform includes core services and orchestration layers that abstract away the complexity of LLM-assisted query translation and structured metadata management, exposing intuitive and declarative interfaces to non-specialist users. The structured data RAG platform 110 provides secure application programming interface (API) access, metadata indexing, dataset agent orchestration, and signal routing for interactive and programmatic query feedback, among other operational functions (e.g., logging or monitoring).

The structured data RAG platform 110 is capable of the ingestion, semantic interpretation, agent object instantiation, query translation, and execution of queries over structured tabular datasets. These structured tabular datasets can include CSV files, spreadsheets, relational database exports, and other machine-readable tabular formats. The structured data RAG platform 110 leverages LLMs and related semantic models to support natural language query translation, fuzzy column matching, approximate string resolution, and multi-table reasoning across dataset agent objects. The platform is not limited to any specific model architecture and can operate with a wide range of foundational models and embedding engines used for semantic parsing and retrieval tasks. These models can include domain-tuned LLMs for enterprise analytics, structured query generation models, and supporting tools such as metadata taggers and statistical profilers for structured data.

The components of the structured data RAG platform 110 include a data ingestion service 112, a metadata extraction service 114, a dataset agent generator 116, a table ranking engine 118, a query processing engine 120, an execution mode selector 122, a workflow execution engine 124, and an agent designer 126 in the example shown. The structured data RAG platform 110 can optionally include other components or omit one or more of the components shown in some cases. The components of the structured data RAG platform 110 can be implemented in containers and orchestrated by a container orchestration framework (e.g., Kubernetes, Docker, etc.) in at least one example. The data store 130 includes memory areas for the storage of structured tabular data 132, converted SQL files 134, short metadata 136A, long metadata 136B, a dataset agent registry 138, query workflow definitions 140, and other types of data associated with structured tabular data processing and querying.

As noted above, the structured data RAG platform 110 enables the ingestion, semantic annotation, agent object instantiation, registration, and querying of structured tabular data using the GUI 184 accessible on the client device 180. For example, a user of the client device 180 can provide one or more structured datasets from the client device 180, or from another host location within the environment 10, to the computing environment 100 and the structured data RAG platform 110. In turn, the structured data RAG platform 110 can ingest and process the structured datasets received from the client device 180. These datasets can be semantically indexed and registered as dataset agents, which are made accessible for querying alongside other predefined or previously processed structured data sources. A full registry of the dataset agents available to the structured data RAG platform 110, including metadata representations, semantic relationships, and column-level annotations, can be stored in the dataset agent registry 138.

The data ingestion service 112 of the structured data RAG platform 110 can receive and process structured tabular datasets submitted from the client device 180, including files in CSV, spreadsheet, and other delimited formats. Upon receipt, the data ingestion service 112 parses the input to extract file-level and schema-level details, such as file structure, delimiters, character encoding, column headers, inferred data types, sample values, and row-level statistics (e.g., record counts, null frequencies). These extracted attributes can be used to generate a normalized internal representation of the input, which is persisted as the structured tabular data 132 in the data store 130. The structured tabular data 132 forms the foundation for downstream metadata extraction and dataset agent object generation. In some implementations, the data ingestion service 112 can also perform structural validation or flag anomalies for further review.

The metadata extraction service 114 can evaluate schema-level and column-level characteristics of the structured tabular data 132 processed by the data ingestion service 112. The metadata extraction service 114 can extract structural, statistical, and semantic metadata, including data types, null value distributions, uniqueness constraints, value ranges, inter-column relationships, and inferred semantic roles. These extracted metadata elements can be partitioned into short metadata 136A and long metadata 136B. The extracted metadata can also be transformed into structured representations used in downstream dataset agent generation, as described below.

The dataset agent generator 116 can construct dataset agent objects based on the short metadata 136A, the long metadata 136B, and, in some implementations, additional data or metadata sources. The dataset agent generator 116 encapsulates the structured metadata, schema definitions, and, optionally, representative sample data into standardized dataset agent object definitions. These definitions represent modular and self-describing formats for dataset agent objects, enabling consistent downstream use in semantic retrieval, query planning, and prompt construction workflows. Each dataset agent object can expose callable interfaces for query generation, metadata inspection, and integration within graphical workflows. The resulting dataset agent objects can be stored in the dataset agent registry 138 of the data store 130, where the dataset agent objects are accessible to the query processing engine 120 and the agent designer 126 for execution and visualization.

The table ranking engine 118 can assist the query processing engine 120 by identifying and prioritizing dataset agent objects that are most relevant to a received query. When a user submits a natural language query, the table ranking engine 118 evaluates available dataset agent objects based on metadata features such as table names, column headers, schema descriptions, and statistical profiles. Using these attributes, the engine computes semantic similarity scores between the query and the metadata of each dataset.

These scores can be used to rank candidate datasets and apply thresholds or filters to exclude irrelevant tables from consideration. By narrowing the search space before query generation, the table ranking engine 118 improves accuracy, reduces computational overhead, and ensures that the most likely datasets are processed first. In this way, the table ranking engine 118 acts as a pre-filtering and prioritization layer, streamlining the query execution process and enhancing end-user responsiveness.

The query processing engine 120 can receive natural language queries from the client device 180, identify matching dataset agent objects, and generate corresponding structured queries, such as SQL or other machine-executable formats. The query processing engine 120 can employ an LLM or similar semantic processing tool to interpret user intent, resolve ambiguous column references, apply filtering logic, and align each query structure with the metadata and schema of the selected dataset agents. By referencing the ranked list of candidate datasets from the table ranking engine 118, the query processing engine 120 focuses on the most relevant agent objects to reduce ambiguity and improve accuracy. Depending on system configuration or user preference, the query processing engine 120 can route the structured query through the execution mode selector 122, which determines whether the query is executed as a direct SQL command or via an LLM-driven agent-based pathway. Generated queries can be validated, traced, and executed against one or more dataset agent objects, with query results formatted for return to downstream components such as the agent designer 126 or the client-side graphical user interface 184.

The execution mode selector 122 can determine the appropriate query execution pathway for a given structured or natural language query. Upon receiving a query from the query processing engine 120, the execution mode selector 122 evaluates execution context, configuration settings, and query complexity to route the query along one of two supported modes. In a direct SQL execution mode, the structured query is executed against the relevant dataset agent objects using traditional database commands. In an LLM-assisted execution mode, the query is passed through one or more agent-based semantic interpretation modules leveraging LLMs. The selection logic used by the execution mode selector 122 can be based on system defaults, user-specified preferences, or dynamically inferred conditions such as query ambiguity, missing schema alignment, or expected reasoning depth. The execution mode selector 122 provides an abstraction layer that separates query generation from execution logic, enabling hybrid workflows and flexible deployment across environments with varying compute or model resources.

In addition to dataset agent objects, users of the client device 180 can include additional workflow elements within the GUI 184, such as input queries, output formatting modules, semantic filters, external data sources, transformation steps, and validation checkpoints. This flexible environment allows users to build complex workflows that operate across multiple datasets and incorporate advanced semantic logic. Once defined, workflows can be executed using the workflow execution engine 124 of the structured data RAG platform 110. The workflow execution engine 124 is responsible for orchestrating the runtime behavior of the defined workflows in response to system events, user actions, or scheduled triggers. The workflow execution engine 124 resolves dependencies between workflow components, invokes corresponding structured query or data transformation operations, and ensures that execution results are delivered to downstream modules such as the agent designer 126 or the GUI 184 for visualization. The query workflow definitions 140 provide a structured repository of these executable workflows, supporting modular reuse and seamless execution across user sessions.

Figure 2A:
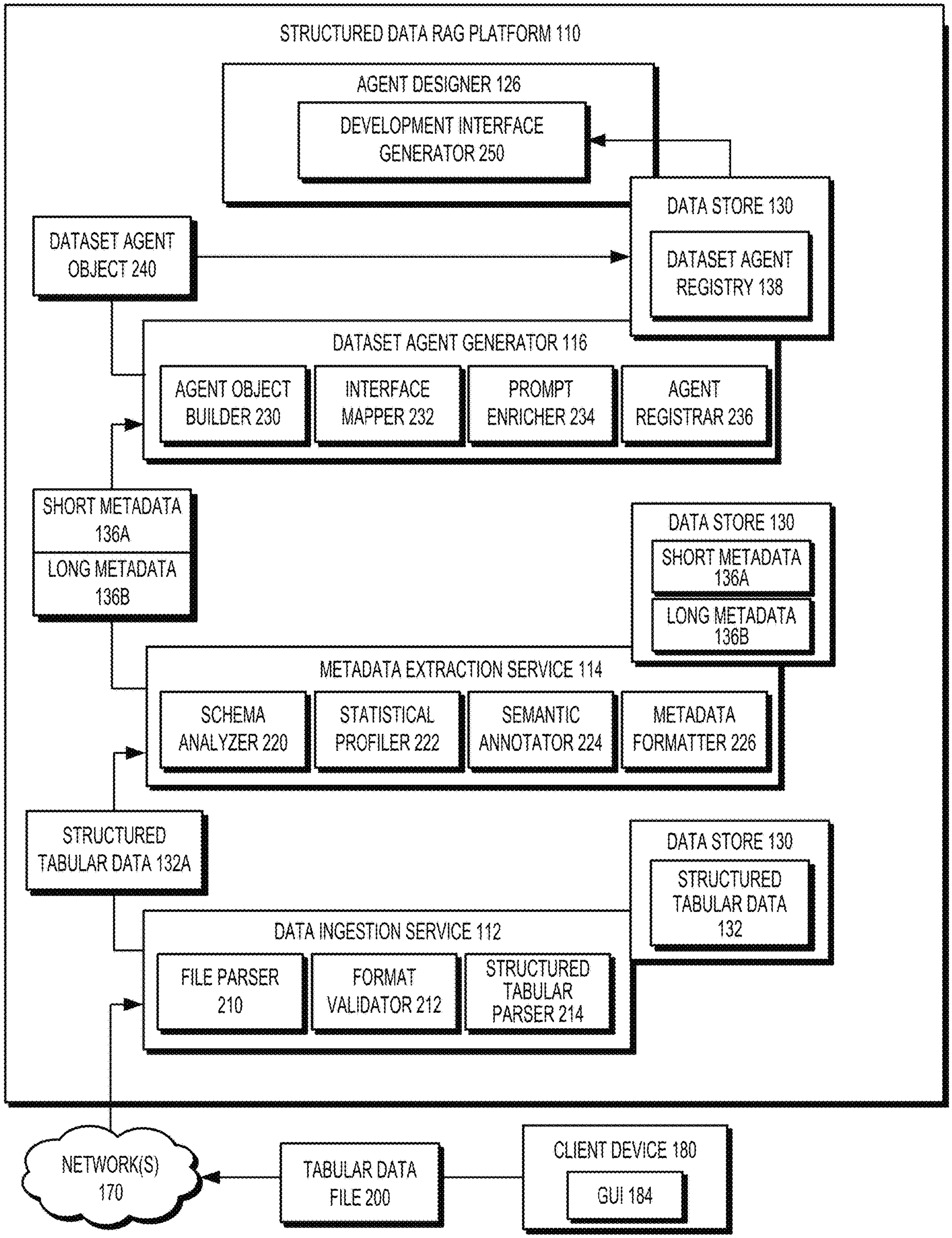
FIG. 2A depicts example components of the structured data RAG platform shown in FIG. 1, according to an example implementation.

The components and services of the environment 10, including those within the structured data RAG platform 110 and data store 130, collectively enable a modular, interpretable, and user-configurable system for querying structured tabular data using natural language inputs in a secure and extensible architecture. The components support flexible deployment, scalable computation, and declarative interfaces that abstract the complexities of LLM-assisted structured data workflows. As described in greater detail with reference to FIG. 2A, the structured data RAG platform 110 includes a set of interacting modules that perform ingestion, metadata extraction, dataset agent generation, semantic ranking, query translation, and hybrid-mode execution. FIG. 2A provides a detailed architectural view of these components and associated internal dataflows, highlighting how these components coordinate to support robust, semantically enriched querying and workflow execution across diverse structured datasets.

FIG. 2A depicts components of the structured data RAG platform 110 within the environment 10 introduced in FIG. 1, including a more detailed architectural view of the ingestion, metadata extraction, dataset agent generation, and registration pipeline executed by the structured data RAG platform 110. As illustrated in the lower portion of FIG. 2A, the client device 180 can prepare or otherwise store a tabular data file 200, such as a CSV, spreadsheet, or other delimited file, and transmit the tabular data file 200 to the structured data RAG platform 110 via the network 170 for semantic processing and querying. The tabular data file 200 can contain one or more structured tables including numerical, categorical, and mixed-type columns suitable for downstream metadata analysis.

The data ingestion service 112 includes a file parser 210, a format validator 212, and a structured tabular parser 214, among possibly other components, in the example shown. Upon receipt, the tabular data file 200 is processed by the data ingestion service 112, which parses, validates, and transforms the file into a normalized representation referred to as structured tabular data 132A. The data ingestion service 112 also generates a file ingestion snapshot 216 (see FIG. 2B) while processing the tabular data file 200, as described below. The structured tabular data 132A serves as an intermediate staging object used by the metadata extraction service 114 to derive structural, statistical, and semantic metadata. Ultimately, the processed data and associated metadata are persisted in the data store 130 as structured tabular data 132 and supporting metadata objects, including short metadata 136A and long metadata 136B, for use in downstream agent generation and query execution workflows.

Figure 2B:
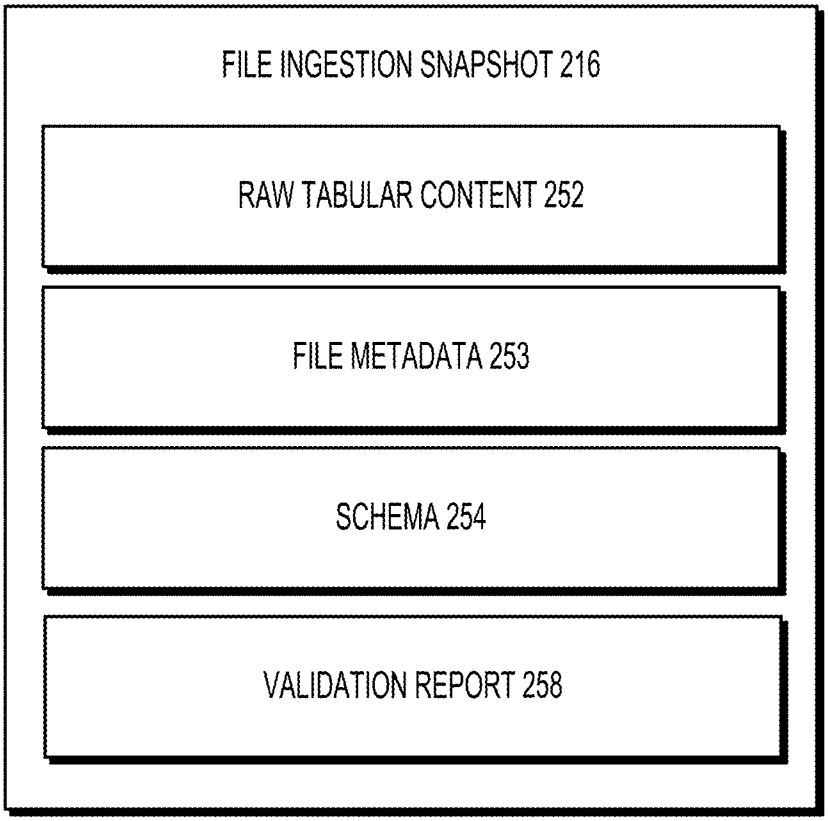
FIG. 2B depicts an example file ingestion snapshot and associated metadata artifacts generated by the data ingestion service of the structured data RAG platform shown in FIG. 1, according to an example implementation.

An example file ingestion snapshot 216 is shown in FIG. 2B. The file ingestion snapshot 216 is generated by the data ingestion service 112 during the processing of the tabular data file 200 received from the client device 180. The file ingestion snapshot 216 includes raw tabular content 252, file metadata 253, a schema 254, and a validation report 258 in the example shown. The file ingestion snapshot 216 can include other data and datatypes in some cases. The file ingestion snapshot 216 represents an intermediate, structured grouping of extracted artifacts created during parsing and validation of the tabular data file 200. The raw tabular content 252 reflects the parsed structure and contents of the submitted tabular data file 200, and file metadata 253 describes characteristics such as delimiter format, character encoding, and record count. The schema 254 can define the organizational structure of the dataset, including inferred column names, data types, and structural relationships. The validation report 258 can capture results from structural and format checks executed by the format validator 212, including any inconsistencies, missing values, or format violations. The file ingestion snapshot 216 can be transiently cached, passed directly to downstream components to support construction of structured tabular data 132A, stored in the data store 130, or handled in other ways as needed for intermediate processing. In some cases, selected elements of the file ingestion snapshot 216, such as the schema 254 or the validation report 258, can be exposed via the GUI 184 to assist users in reviewing dataset contents or configuring dataset agent objects. Additional aspects of the ingestion workflow are described below with reference to FIG. 6.

Following ingestion, the structured tabular data 132A is processed by the metadata extraction service 114 to derive structural, statistical, and semantic metadata artifacts that support downstream agent generation and query execution. As shown in FIG. 2A, the metadata extraction service 114 includes a schema analyzer 220, a statistical profiler 222, a semantic annotator 224, and a metadata formatter 226. The schema analyzer 220 can extract structural descriptors from the structured tabular data 132A, including column headers, inferred data types, nullability flags, and schema conformance. The statistical profiler 222 can evaluate row-level and column-level distributions to produce metrics, such as record counts, value ranges, uniqueness statistics, missing value frequencies, and other metrics. The semantic annotator 224 can apply semantic inference and heuristic tagging to identify relationships among columns, annotate contextual roles, and support downstream natural language query alignment. The outputs from these modules can be consolidated by the metadata formatter 226, which organizes the extracted metadata into short metadata 136A and long metadata 136B. The short metadata 136A and long metadata 136B metadata objects are stored in the data store 130 and provide a comprehensive, multi-layered representation of the structured tabular data 132A for use in dataset agent construction and semantic query planning by the structured data RAG platform 110.

The dataset agent generator 116 can generate a dataset agent object 240 for each tabular data file 200 processed by the system. The dataset agent generator 116 uses both the short metadata 136A and the long metadata 136B output by the metadata extraction service 114 to assemble a structured, callable agent representation of the ingested data, in at least one approach. The dataset agent generator 116 includes an agent object builder 230, an interface mapper 232, a prompt enricher 234, and an agent registrar 236, among possibly other components.

The agent object builder 230 constructs the initial instantiable representation of the dataset agent object 240, incorporating schema-level and semantic metadata. The interface mapper 232 defines the callable interface of the dataset agent object 240, including supported query operations, metadata access points, and data exploration hooks. The prompt enricher 234 enhances the dataset agent object 240 with contextually useful metadata, tags, and/or patterns that support LLM operations such as query expansion or disambiguation. The agent registrar 236 finalizes the dataset agent object 240 and stores the dataset agent object 240 in the dataset agent registry 138, enabling subsequent discovery and access by downstream modules such as the agent designer 126.

Once the dataset agent object 240 is registered, the dataset agent object 240 becomes available to the agent designer 126, which is configured to expose the object to a user of the client device 180 through the GUI 184. The agent designer 126 includes a development interface generator 250, which can be used to query the dataset agent registry 138 and dynamically render a graphical interface that displays available agent objects and their capabilities. The dataset agent registry 138 maintains records of all registered dataset agent objects 240, including schema bindings, callable interfaces, and enrichment annotations. In response to new registrations, the development interface generator 250 can update the GUI 184 to display the dataset agent object 240 as a selectable and configurable node within a low-code/no-code graphical workflow canvas. An example of the GUI 184 is described below with reference to FIG. 3. The GUI 184 enables users to build structured query workflows that incorporate registered dataset agents and to orchestrate workflows using intuitive visual components. Accordingly, the dataset agent registry 138 serves as a centralized repository for declarative, semantically enriched data agent definitions that power the end-user workflow experience through the structured data RAG platform 110.

Figure 3:
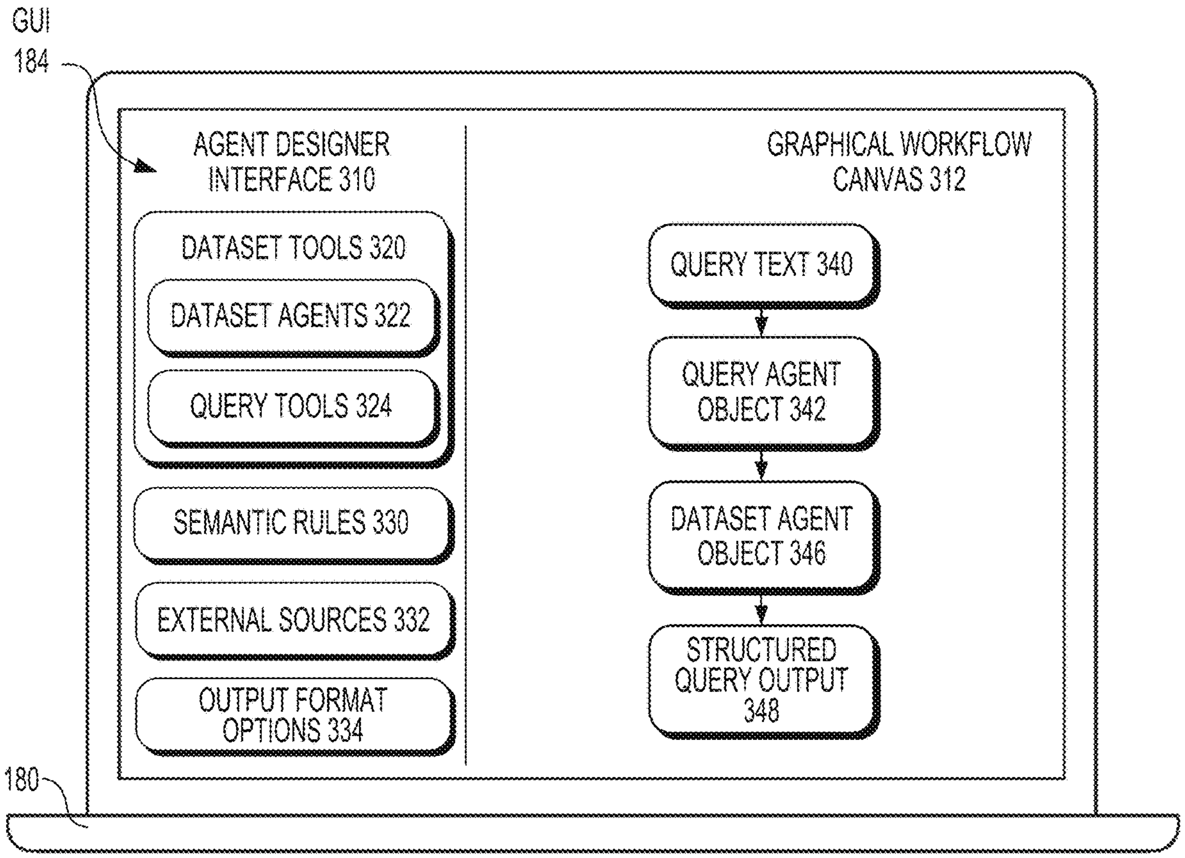
FIG. 3 depicts an example graphical user interface (GUI) presented by an agent designer of the structured data RAG platform shown in FIG. 1, enabling users to construct executable workflows using registered agent objects, according to an example implementation.

FIG. 3 depicts an example GUI 184 rendered on the client device 180 and generated by the development interface generator 250 of the agent designer 126. The GUI 184 can be displayed via a browser application or a native application (e.g., the application 182) and supports interactive design and configuration of data-driven workflows within the structured data RAG platform 110. The GUI 184 includes an agent designer interface 310 and a graphical workflow canvas 312 in the example shown. The agent designer interface 310 enables users to browse and select from available agent components, tools, and metadata controls. The graphical workflow canvas 312 supports visual composition of workflows using dataset agent objects, query agents, rules, and output blocks. FIG. 3 provides one illustrative layout of the GUI 184. The actual interfaces of the GUI 184 can vary based on system configuration, user customization, and other factors.

Within the agent designer interface 310, a dataset tools section 320 is provided for constructing workflows using structured data resources. The dataset agents 322 shown in this section correspond to dataset agent objects 240 generated by the dataset agent generator 116 and registered in the dataset agent registry 138. These agent objects represent semantically structured tabular data and expose callable interfaces that can be included in executable workflows. Adjacent to the dataset agents 322, a query tools section 324 provides modules for constructing queries, including natural language and structured query blocks.

Other configurable options in the agent designer interface 310 include semantic rules 330, external sources 332, and output format options 334. The semantic rules 330 can encode user-defined logic, domain knowledge, or constraints that affect query resolution and transformation. The external sources 332 can connect the workflow to third-party datasets or APIs for data enrichment. The output format options 334 provide control over the structure and layout of the final output, such as CSV, JavaScript Object Notation (JSON), tables, or visual charts, allowing users to route query results into the most suitable downstream format.

The graphical workflow canvas 312 allows the user to visually define and inspect execution graphs composed of interconnected agent objects. As shown, the graphical workflow canvas 312 can begin with a query text block 340 that captures user-provided input in natural language. This input is passed to a query agent object 342, which semantically parses the query and, if configured, uses an LLM to generate a structured query suitable for execution. The resulting query is routed to a dataset agent object 346 that represents the tabular dataset targeted for analysis.

Upon receiving the structured query, the dataset agent object 346 executes the query against the corresponding structured data instance and produces a structured query output 348. This output block serves as a terminal node for the workflow, providing data for review, export, or transmission. The output can be rendered directly in the GUI 184, stored in the data store 130, or passed to downstream processing components.

Although FIG. 3 illustrates a linear execution flow, the GUI 184 supports arbitrarily complex configurations, including conditional routing, multi-agent pipelines, and metadata-informed filtering. Using the GUI 184, users can layer components such as schema validators, transformation modules, or query postprocessors. Overall, the GUI 184 enables low-code composition of semantically rich workflows anchored on registered dataset agent objects. Once defined, the resulting workflow is stored in the query workflow definitions 140 and can be executed by the workflow execution engine 124. The GUI 184 supports the generation of a wide range of different defined workflows, and an example defined workflow 400 and the execution thereof is described below with reference to FIG. 4.

Figure 4:
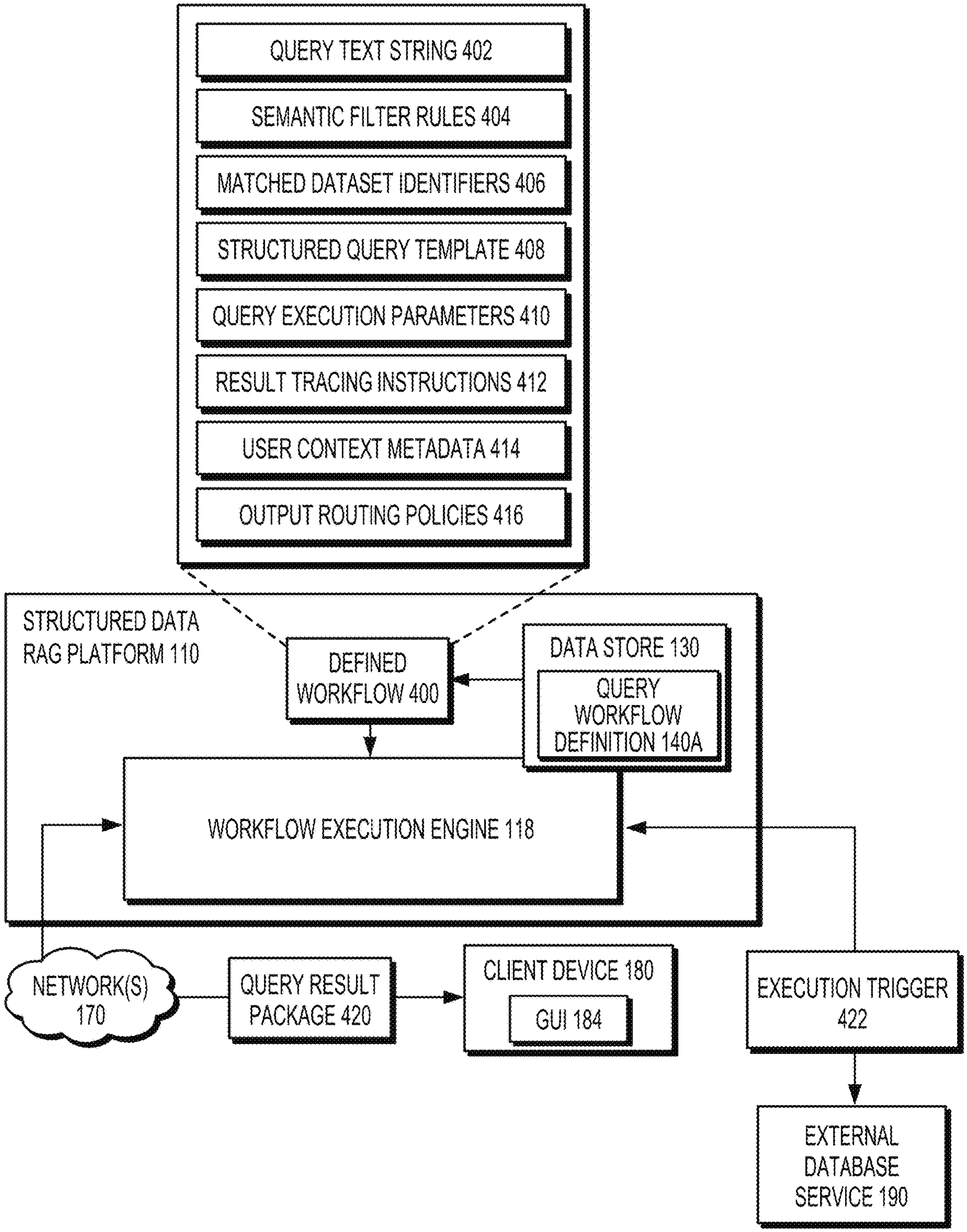
FIG. 4 depicts an example execution of a user-defined workflow by a workflow execution engine of the structured data RAG platform according to an example implementation.

FIG. 4 depicts an example runtime execution sequence of a defined workflow 400. Execution of the defined workflow 400 can be orchestrated by the workflow execution engine 124 within the structured data RAG platform 110, as introduced in FIG. 1. The defined workflow 400 can be authored by a user of the client device 180 using the GUI 184 and subsequently stored as a query workflow definition 140A within the data store 130. In alternative implementations, the defined workflow 400 can be triggered programmatically or initiated in response to an external execution trigger 422 originating from an external database service 190. As depicted, workflow execution can be initiated from various sources within the environment 10, including the client device 180, external services, or internal automation services of the structured data RAG platform 110.

The defined workflow 400 represents a semantically enriched specification of a structured query processing task within the structured data RAG platform 110. Unlike static query definitions, the defined workflow 400 encapsulates a combination of user-provided inputs and system-generated metadata elements. The user-provided inputs and system-metadata elements collectively govern the behavior, constraints, and output routing of the defined workflow 400. The defined workflow 400 includes a query text string 402, semantic filter rules 404, matched dataset identifiers 406, a structured query template 408, query extraction parameters 410, result tracing instructions 412, user context metadata 414, and output routing policies 416, among possibly other types of data and data structures, in the example shown.

The query text string 402 serves as the entry point for user intent and can include a natural language question, a structured instruction, or a templated prompt submitted via the GUI 184. The query text string 402 can be authored manually by the user or selected from a predefined workflow template. The query text string 402 can be processed in conjunction with semantic filter rules 404 that refine or constrain the behavior of the resulting structured query. The semantic filter rules 404 can include explicit conditions such as numerical ranges, value exclusions, pattern matches, or field-level logic that guides dataset selection and query translation. The semantic filter rules 404 can be derived from explicit user selections in the GUI 184, inferred from contextual metadata associated with the client device 180, or programmatically generated based on historical interactions, usage patterns, or domain-specific profiles.

The matched dataset identifiers 406 can include identify one or more dataset agent objects that have been previously generated by the dataset agent generator 116 and stored in the dataset agent registry 138. The identifiers enable the workflow execution engine 124 to resolve which structured datasets are semantically aligned with the submitted query. The matching can rely on various techniques, such as metadata similarity, column header overlap, semantic vector proximity, or statistical feature matching. Identifiers can take the form of unique object handles, dataset labels, or internal references associated with prior ingestion and registration events.

The structured query template 408 represents a normalized, machine-executable representation of the query defined within the workflow. This template can be expressed in various forms, such as a parameterized SQL statement, a JSONPath or XPath expression, a graph traversal query (e.g., Gremlin or Cypher), or another intermediate representation generated by the structured data RAG platform 110. The structured query template 408 can be derived from the query text string 402 through a combination of syntactic parsing and semantic translation. In some cases, the structured data RAG platform 110 can apply an LLM or domain-specific language model to aid in transforming the original natural language prompt into the template form.

Query execution parameters 410 define runtime-level configuration settings that control how the structured query is executed. The query execution parameters 410 can include row count limits, timeout thresholds, sort order directives, pagination rules, group-by conditions, null-handling preferences, and other configuration settings. In some implementations, the query execution parameters 410 can also include compute allocation flags, isolation levels, security or privacy constraints, or execution priority indicators. These parameters allow the workflow execution engine 124 to tailor execution behavior in accordance with user intent, system policy, or tenant-specific constraints.

Result tracing instructions 412 provide directives for tracking and logging intermediate stages of query execution. These instructions can enable the capture of transformation steps, query optimization paths, operator-level metrics, or metadata lineage. The workflow execution engine 124 can also apply the result tracing instructions 412 to generate audit logs, compliance traces, or telemetry events. These artifacts can support runtime observability, debugging workflows, compliance verification, or explainability tooling presented to users through the GUI 184 or external interfaces.

The user context metadata 414 provides contextual information about the requesting user and session. The user context metadata 414 can include user identity tokens, organizational affiliation, session state variables, regional or locale settings, assigned access roles, and user-defined tags or labels. The user context metadata 414 can be used by the workflow execution engine 124 to enforce access control policies, apply user-specific query scoping, and annotate logs or telemetry events for auditability and attribution.

The output routing policies 416 define the destination and delivery method for query results following workflow execution. The output routing policies 416 can specify one or more output channels, including direct rendering within the GUI 184 of the client device 180, transmission to an external endpoint via webhook, storage in a shared cloud directory, delivery to an API callback, or publication to a messaging queue or event-driven pipeline. Routing behavior can be dynamically determined based on user permissions, dataset classification, query result size, or integration settings associated with downstream systems.

Upon receipt of the defined workflow 400, the workflow execution engine 124 initiates runtime orchestration by interpreting the query structure and executing the required steps for fulfillment. This can include resolving the matched dataset agent objects identified by the workflow, executing the structured query template 408 using integrated query engines or LLM-backed agents, applying execution parameters, enforcing tracing and access constraints defined in the user context metadata 414, and preparing the resulting data for delivery based on the output routing policy 416.

During runtime execution, the workflow execution engine 124 can also invoke external services as part of the workflow logic. As illustrated, an execution trigger 422 can be issued to an external database service 190 to retrieve external data, initiate enrichment processes, or activate third-party services. The execution trigger 422 can be generated based on tool invocation rules, output routing policies, or predefined bindings that associate workflow components with external endpoints. The execution trigger 422 can be transmitted as a structured payload including query parameters, data references, or user context metadata.

Upon completion of the structured query execution, the workflow execution engine 124 generates a query result package 420. The query result package 420 encapsulates the structured result set, associated metadata, and, where applicable, execution trace logs. The query result package 420 is transmitted to the client device 180 for review, interactive visualization, or export. Within the GUI 184, the user can inspect, refine, or save the results into persistent workflow definitions for future execution.

Figure 5A:
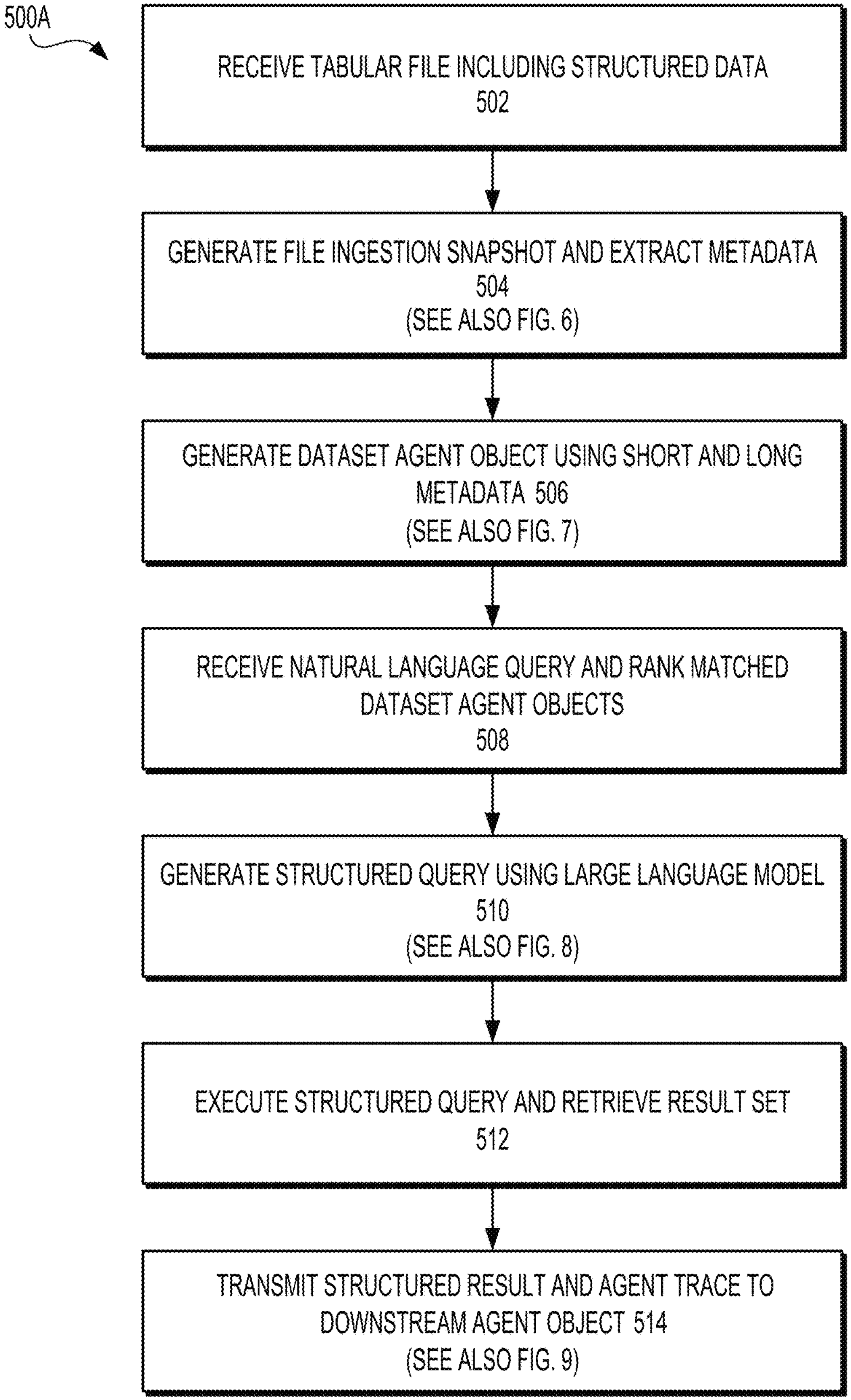
FIG. 5A depicts a method for processing structured data submissions, generating dataset agent objects, and integrating the dataset objects into executable workflows according to an example implementation.
Figure 5B:
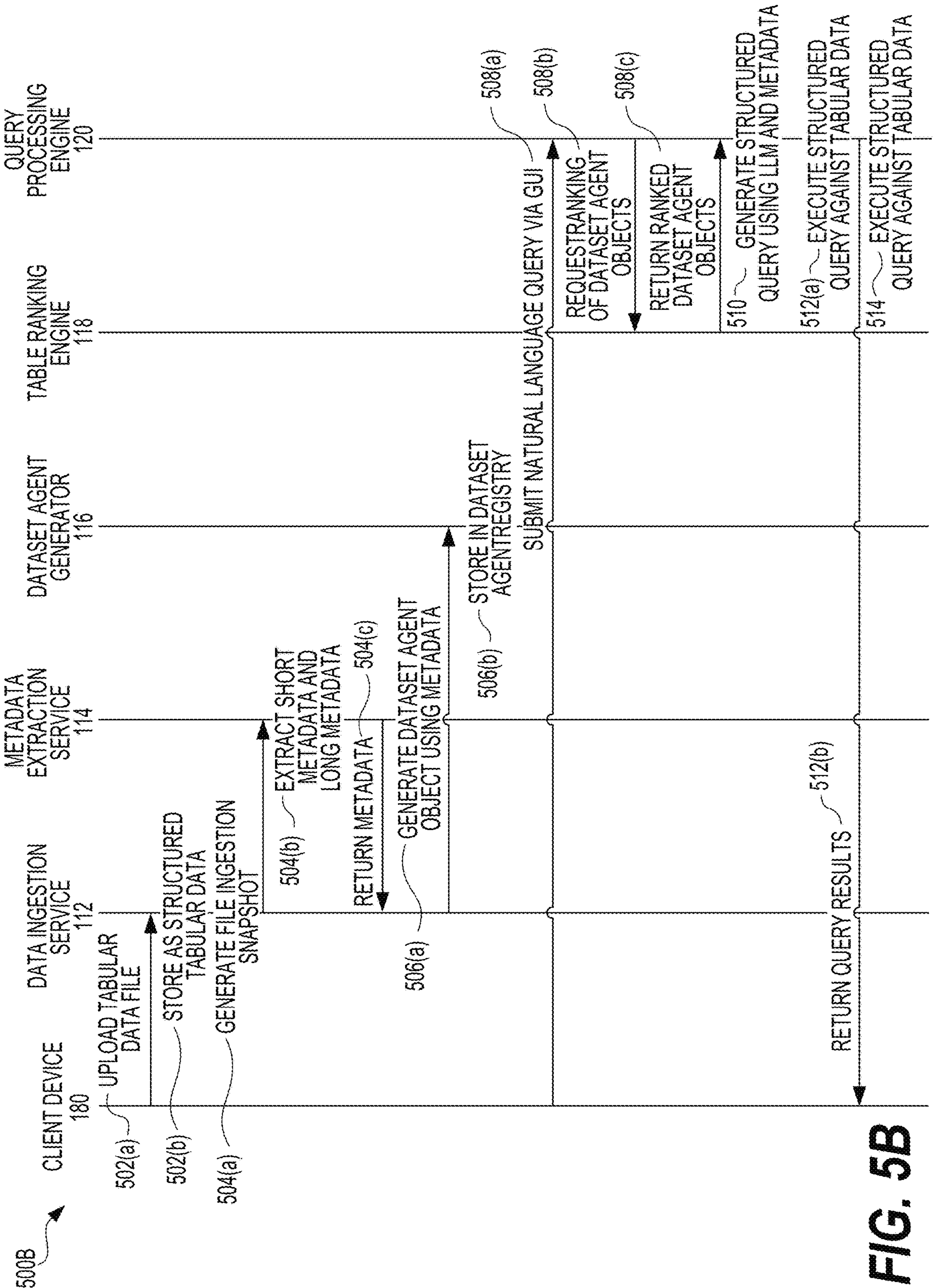
FIG. 5B depicts a sequence diagram illustrating the interactions between system components during execution of the method shown in FIG. 5A.

FIG. 5A depicts a method 500A for processing structured tabular data, generating dataset agent objects, receiving natural language queries, and executing corresponding structured queries within a semantic workflow environment according to an example implementation. FIG. 5B depicts a corresponding sequence diagram 500B showing the temporal interactions between components of the structured data RAG platform 110 when performing the method 500A The method 500A can be performed by one or more computing devices within the structured data RAG platform 110, as introduced in FIG. 1. The method 500A supports semantic access to structured data through agent-driven query workflows and natural language interfaces. While described in the context of the structured data RAG platform 110, the method 500A can also be implemented across other computing environments, including distributed, cloud-based, on-premises, or hybrid infrastructures. As detailed in the following steps, the method 500A automates the transformation of raw structured data into a semantically enriched, queryable format that supports RAG and declarative workflow execution.

At block 502, the method 500A includes receiving a tabular data file that contains structured information. As an example, the method 500A can include the structured data RAG platform 110 receiving the tabular data file 200 from the client device 180, as shown in FIG. 2A. Thus, as also shown in FIG. 5B at 502(*a*), the client device 180 uploads the tabular data file to the data ingestion service 112. The tabular data file 200 can include a CSV file, spreadsheet, or other delimited format. The tabular data file 200 can be uploaded by a user of the client device 180 to the structured data RAG platform 110 using the GUI 184, as one example. The submitted tabular data file 200 can include numerical, categorical, timestamped, or mixed-type values organized into rows and columns under a consistent schema. The tabular data file 200 can be transmitted over the network 170 and received by the data ingestion service 112 of the structured data RAG platform 110, which stores the content as structured tabular data 132 within the data store 130. FIG. 5B shows storing the structured tabular data 132 within the data store 130 at 502(*b*). The parsed version of this file is preserved as structured tabular data 132A, serving as the foundational input artifact for downstream ingestion, metadata extraction, agent object generation, and semantic querying, as detailed in the subsequent blocks.

At block 504, the method 500A includes generating a file ingestion snapshot and extracting metadata, including short metadata and long metadata, from the tabular data file received at block 502. The sequence diagram in FIG. 5B shows this process at 504(*a*), where the data ingestion service 112 generates the file ingestion snapshot. As an example, the data ingestion service 112 can process the tabular data file 200 shown in FIG. 2A and generate the file ingestion snapshot 216 shown in FIG. 2B. Generating the file ingestion snapshot 216 comprises parsing the structured input file using the data ingestion service 112, validating the contents, and constructing an intermediate representation for downstream processing. As shown in FIG. 2B, the file ingestion snapshot 216 includes raw tabular content 252, file metadata 253, a schema 254, and a validation report 258. These components collectively represent a structured summary of the input data and support semantic interpretation during metadata extraction.

Block 504 can also include the metadata extraction service 114 operating on the file ingestion snapshot 216 and extracting both the short metadata 136A and long metadata 136B artifacts shown in FIG. 2A. As illustrated at 504(*b*) in FIG. 5B, the metadata extraction service 114 extracts both short metadata and long metadata from the file ingestion snapshot. The schema analyzer 220 and statistical profiler 222 can generate the short metadata 136A by identifying structural characteristics such as column names, data types, value ranges, null frequency, and row counts. In parallel, the semantic annotator 224 and metadata formatter 226 can generate the long metadata 136B, which includes semantic labels, inferred column relationships, and context-aware insights derived from statistical and heuristic analysis. The resulting short metadata 136A and long metadata 136B are stored in the data store 130 and used in the next phase of dataset agent object construction. As illustrated at 504(*c*) in FIG. 5B, the metadata extraction service 114 returns the extracted metadata to the data ingestion service 112. Additional details of these metadata extraction processes are provided with reference to FIG. 6.

At block 506, the method 500A includes generating a dataset agent object using the short metadata and the long metadata extracted at block 504. This process is shown in FIG. 5B at 506(*a*), where the data ingestion service 112 sends the metadata to the dataset agent generator 116. This step involves using both the short metadata 136A and long metadata 136B shown in FIG. 2A, for example, to instantiate a dataset agent object of the ingested dataset. The dataset agent generator 116 of the structured data RAG platform 110 can perform this task using a modular pipeline that includes the agent object builder 230, interface mapper 232, prompt enricher 234, and agent registrar 236 shown in FIG. 2A.

Block 506 can include the agent object builder 230 initializing the dataset agent object 240 based on schema and data profile information obtained during metadata extraction. The interface mapper 232 defines programmatic query and metadata interfaces for interacting with the dataset agent object 240, while the prompt enricher 234 augments the dataset agent object 240 with semantic context and LLM-friendly descriptors to facilitate downstream natural language interactions. As shown at 506(*b*) in FIG. 5B, the agent registrar 236 stores the resulting dataset agent object 240 in the dataset agent registry 138, where the dataset agent object 240 becomes available for use in query workflows and is surfaced for use and inclusion in defined workflows through the GUI 184. A registered dataset agent object 240 encapsulates the operational, structural, and semantic properties of the dataset and supports intelligent query handling, as described in block 508 and FIG. 7.

At block 508, the method 500A includes receiving a natural language query and ranking matched dataset agent objects. For example, as shown at 508(*a*) in FIG. 5B, the client device 180 submits a natural language query via the GUI 184 to the query processing engine 120. Receiving the natural language query can include capturing a user-submitted prompt via the GUI 184 of the client device 180. The prompt can be a freeform text question, structured instruction, or query pattern issued to retrieve insights from one or more structured tabular datasets registered within the structured data RAG platform 110. The query is transmitted over the network 170 and received by the query processing engine 120 for analysis.

Upon receipt, the query processing engine 120 interacts with the table ranking engine 118 to evaluate all available dataset agent objects 240 stored in the dataset agent registry 138, as shown at 508(*b*) in FIG. 5B. The table ranking engine 118 assigns a relevance score to each dataset agent object based on factors such as column name similarity, semantic metadata matching, statistical profiles, and query intent overlap. These scores are used to produce a prioritized list of matched datasets most likely to contain the information sought by the user. This ranked list is then returned to the query processing engine 120, as shown at 508(*c*) in FIG. 5B, and passed to subsequent query generation steps, providing a filtered set of agent objects suitable for structured query construction.

At block 510, the method 500A in FIG. 5A includes generating a structured query using a large language model. FIG. 5B also illustrates that the query processing engine 120 generates a structured query using an LLM and the metadata at 510. Generating the structured query can include semantically transforming the natural language query into an executable format, such as SQL, JSON-based logic, or another structured representation appropriate for the target dataset. For example, the query processing engine 120 can generate a structured query by invoking an embedded or external LLM that interprets the query intent, references the ranked dataset agent objects from block 508, and constructs a structured query aligned with the metadata of the selected dataset. During this transformation, the LLM can access the short metadata 136A and long metadata 136B associated with each agent to resolve ambiguous column names, apply filters, and determine grouping or aggregation operations. The resulting structured query reflects a canonical form of the user request that is syntactically valid and semantically grounded in the ingested dataset. This structured query is packaged for execution in the next phase of the workflow, optionally enriched with user context or parameter overrides as described with reference to FIG. 8.

At block 512, the method 500A includes executing the structured query and retrieving the result set. As shown at 512(*a*) in FIG. 5B, the query processing engine 120 executes the structured query against the tabular data. For example, executing the structured query can include submitting the query to the query processing engine 120 of the structured data RAG platform 110, which evaluates the structured query against the tabular data associated with the selected dataset agent object 240. Executing the structured query can also include performing multi-dataset joins, wherein relationships between two or more dataset agent objects are resolved using inter-object metadata relationships defined in the metadata index. These relationships can include inferred foreign key mappings or schema correspondences extracted during metadata analysis.

The dataset agent object 240 provides the workflow execution engine 124 with metadata-scoped access to the underlying structured tabular data 132A. The engine interprets the structured query, resolves column references using the metadata bindings, and applies operations such as filtering, joining, aggregation, or transformation as defined by the query. Execution behavior can also be influenced by runtime parameters such as pagination settings, row limits, and user context metadata.

The output of this executing the structured query at block 512 is a structured result set aligned with the query intent. This result set is formatted for further transmission or integration within downstream components, including workflow continuation, visualization, or external routing, as described in block 514. The results are also returned to the client device 180 as shown at 512(*b*) in FIG. 5B.

At block 514, the method 500A includes transmitting the structured result and agent trace to a downstream agent object. As illustrated at 514 in FIG. 5B, the query processing engine 120 executes the structured query against the tabular data to prepare the results for downstream transmission. This step occurs after successful execution of the structured query, when the output result and corresponding execution context are passed forward to support subsequent stages of the workflow. The structured result can include tabular records, aggregated values, statistical summaries, or any other data elements computed during the query. Alongside the result, the structured data RAG platform 110 can generate an agent trace that captures the operational context of the originating dataset agent object 240 in some cases. The agent trace can include query parameters, input metadata, column-level mappings, transformation steps, and runtime diagnostics.

Figure 9:
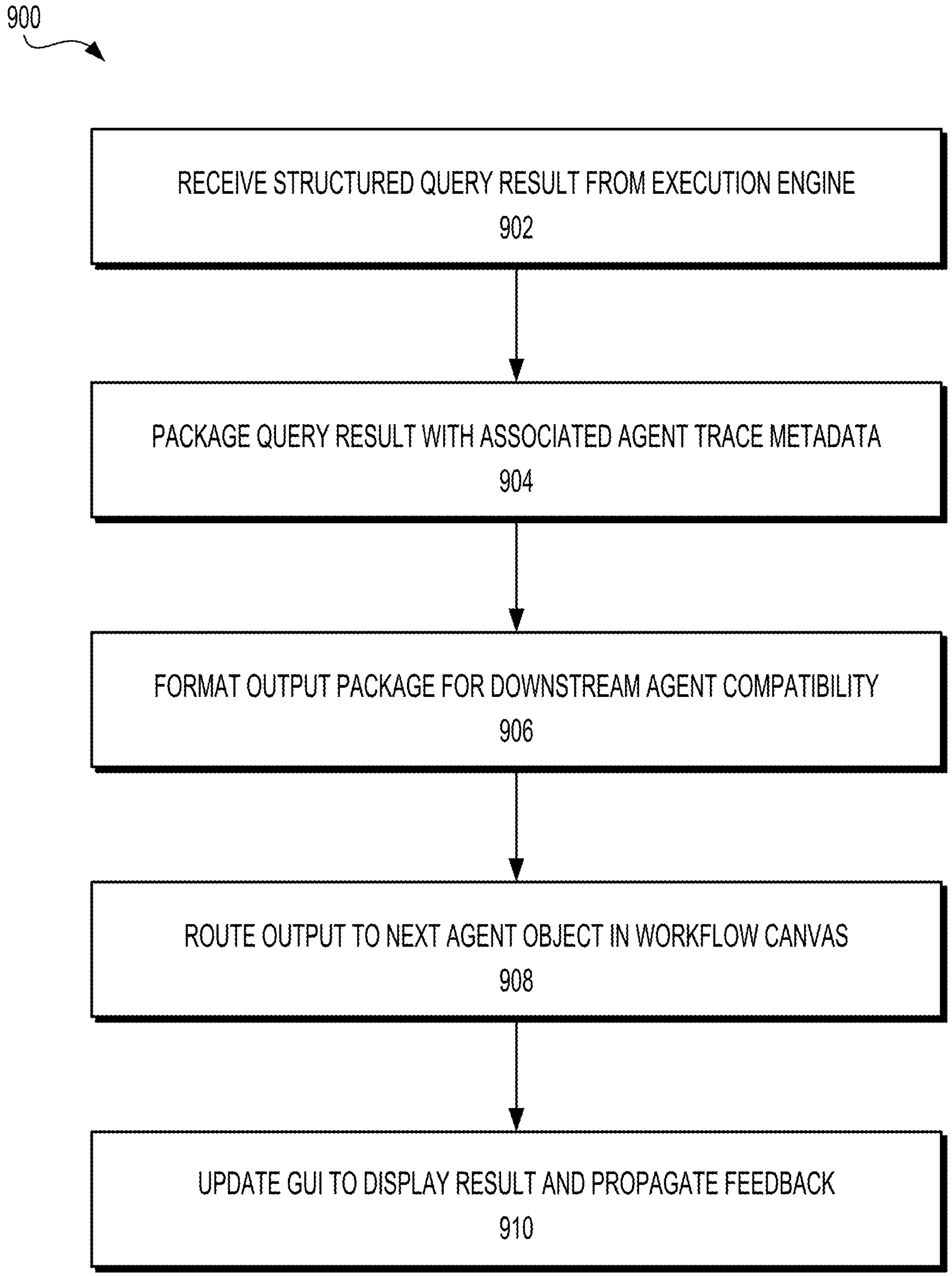
FIG. 9 depicts a method for executing a workflow containing dataset agent objects and propagating execution results across agent nodes according to an example implementation.

Together, the structured result and agent trace can be packaged and transmitted to a downstream agent object, such as another query agent, transformation module, or user interface renderer, for further processing or composition. This transition preserves semantic continuity across the workflow and enables advanced chaining and reuse of intermediate results. FIG. 9 illustrates an example of this downstream handoff and agent-to-agent signal routing within a declarative workflow graph.

Figure 6:
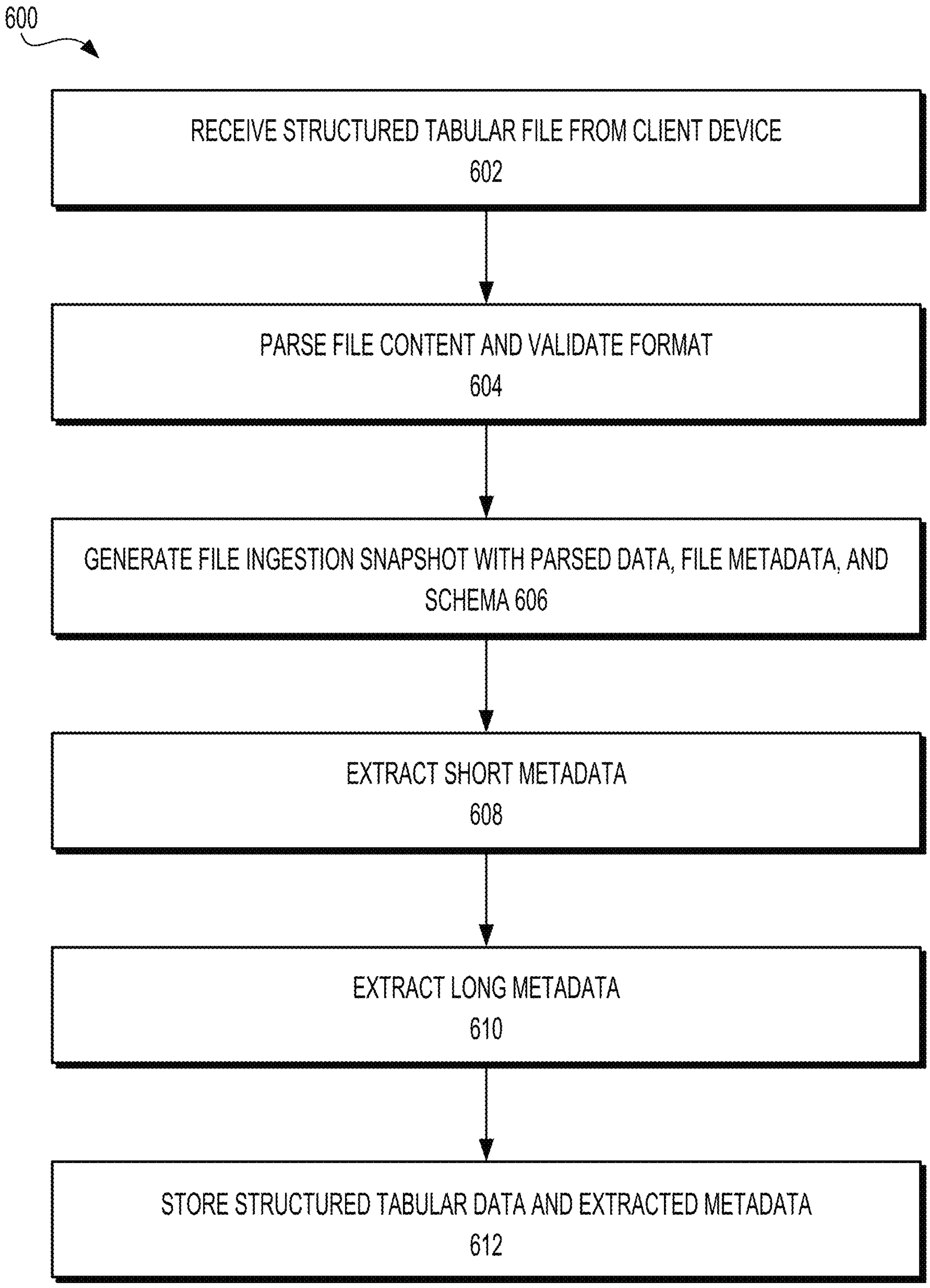
FIG. 6 depicts a method for extracting metadata from a structured data file according to an example implementation.

FIG. 6 depicts a method 600 for processing structured tabular data files for ingestion and metadata extraction in the structured data RAG platform 110 according to an example implementation. The method 600 can be performed by one or more computing devices operating within a networked computing environment, such as the structured data RAG platform 110 and other systems in the environment 10 shown in FIG. 1. As described in connection with FIGS. 1, 2A, 2B, and 5, the structured data RAG platform 110 can be configured to ingest tabular data files 200, extract descriptive and semantic metadata, and store this information for downstream agent generation and query processing. The operations of the method 600 provide a detailed breakdown of the ingestion and metadata extraction pipeline performed for each structured tabular data file submitted by a user of the client device 180.

At block 602, the method 600 includes receiving the tabular data file 200 from the client device 180. Receiving the tabular data file 200 at block 602 can include accepting one or more data file, such as a CSV file, spreadsheet file, or similar delimited text file, from the client device 180 via the network 170. The tabular data file 200 can be transmitted through the GUI 184 presented to the user by the application 182 on the client device 180. The tabular data file 200 can include numerical, categorical, and mixed-type columns suitable for downstream processing. Upon receipt, the structured data RAG platform 110 stores the tabular data file 200 as part of the structured tabular data 132 memory area within the data store 130 for further ingestion and metadata extraction.

At block 604, the method 600 includes parsing the file content and validating the format of the structured tabular file received from the client device. Parsing the file content can involve reading the raw file input, detecting delimiter types, identifying header rows, normalizing encoding formats, and extracting the underlying tabular structure. The data ingestion service 112 can perform this parsing operation using the file parser 210. Format validation can then be performed by the format validator 212, which checks the structural integrity and conformance of the file content to expected schema rules. This can include verifying the consistency of column counts, checking for malformed rows, validating data types, and detecting unsupported or corrupt formatting. If any errors or warnings are detected during format validation, the errors or warnings can be recorded in a validation report and optionally surfaced to the user through the GUI 184.

At block 606, the method 600 includes generating a file ingestion snapshot using the parsed data, file metadata, and inferred schema. Generating the file ingestion snapshot at block 606 can include the data ingestion service 112 constructing a structured representation of the input tabular data received from the client device 180. The data ingestion service 112 can perform this operation by aggregating multiple components derived from the parsing and validation process. The resulting file ingestion snapshot 216 includes raw tabular content 252, file metadata 253 (e.g., delimiter type, encoding format, and record count), a schema 254 identifying column names and data types, and a validation report 258 recording the outcome of format checks. These components are organized as a cohesive snapshot that captures both the structure and characteristics of the ingested file. The file ingestion snapshot 216 is passed to the metadata extraction service 114 for further analysis, including generation of short and long metadata, as described in subsequent blocks of the method 600. If the structured tabular file includes a spreadsheet file with multiple worksheets, each worksheet can be treated as an independent dataset during the ingestion process, resulting in the generation of separate ingestion snapshots and corresponding dataset agent objects.

At block 608, the method 600 includes extracting short metadata from the file ingestion snapshot. Extracting the short metadata at block 608 can include the metadata extraction service 114 analyzing the raw tabular content 252, file metadata 253, and schema 254 of the file ingestion snapshot 216 to generate concise structural summaries of the dataset. The metadata extraction service 114 can perform this operation using the metadata formatter 226, which evaluates attributes such as column names, inferred data types, nullability flags, row and column counts, minimum and maximum values, and basic statistical profiles. The resulting short metadata 136A is stored in the data store 130 and provides a foundational metadata layer for indexing, query planning, and user-facing previews. In some implementations, the short metadata 136A can also be exposed through the GUI 184 to support dataset inspection and validation workflows.

At block 610, the method 600 includes extracting long metadata from the file ingestion snapshot. Extracting the long metadata at block 610 can include the metadata extraction service 114 performing a deeper semantic and statistical analysis of the raw tabular content 252 and schema 254 within the file ingestion snapshot 216. The metadata extraction service 114 can perform this operation using the statistical profiler 222, which applies statistical profilers, semantic annotation models, and heuristic inference tools to identify patterns, assign semantic labels to columns, infer measurement units, and detect inter-column relationships such as correlations or referential links. The resulting long metadata 136B provides enriched contextual insight and is stored in the data store 130 alongside the short metadata 136A. Together, these metadata layers support subsequent agent object generation, semantic query alignment, and advanced reasoning within the structured data RAG platform 110. The short metadata 136A and long metadata 136B can be stored in separate storage containers or index partitions within the data store 130, allowing for independent access and update operations. This enables fast retrieval of lightweight metadata for initial query filtering, while preserving access to rich semantic metadata for downstream processing.

At block 612, the method 600 includes storing the extracted metadata in a metadata repository. Storing the extracted metadata at block 612 can include writing or otherwise storing both the short metadata 136A and the long metadata 136B into the data store 130 of the structured data RAG platform 110. The metadata repository within the data store 130 organizes these metadata artifacts into structured, queryable formats that capture schema attributes, statistical properties, semantic labels, and inter-column relationships. This repository serves as the foundational metadata layer used by the dataset agent generator 116 to instantiate dataset agent objects. Persistent storage ensures version control, facilitates reuse across workflows, and supports auditability and traceability for structured tabular data ingested into the platform.

Figure 7:
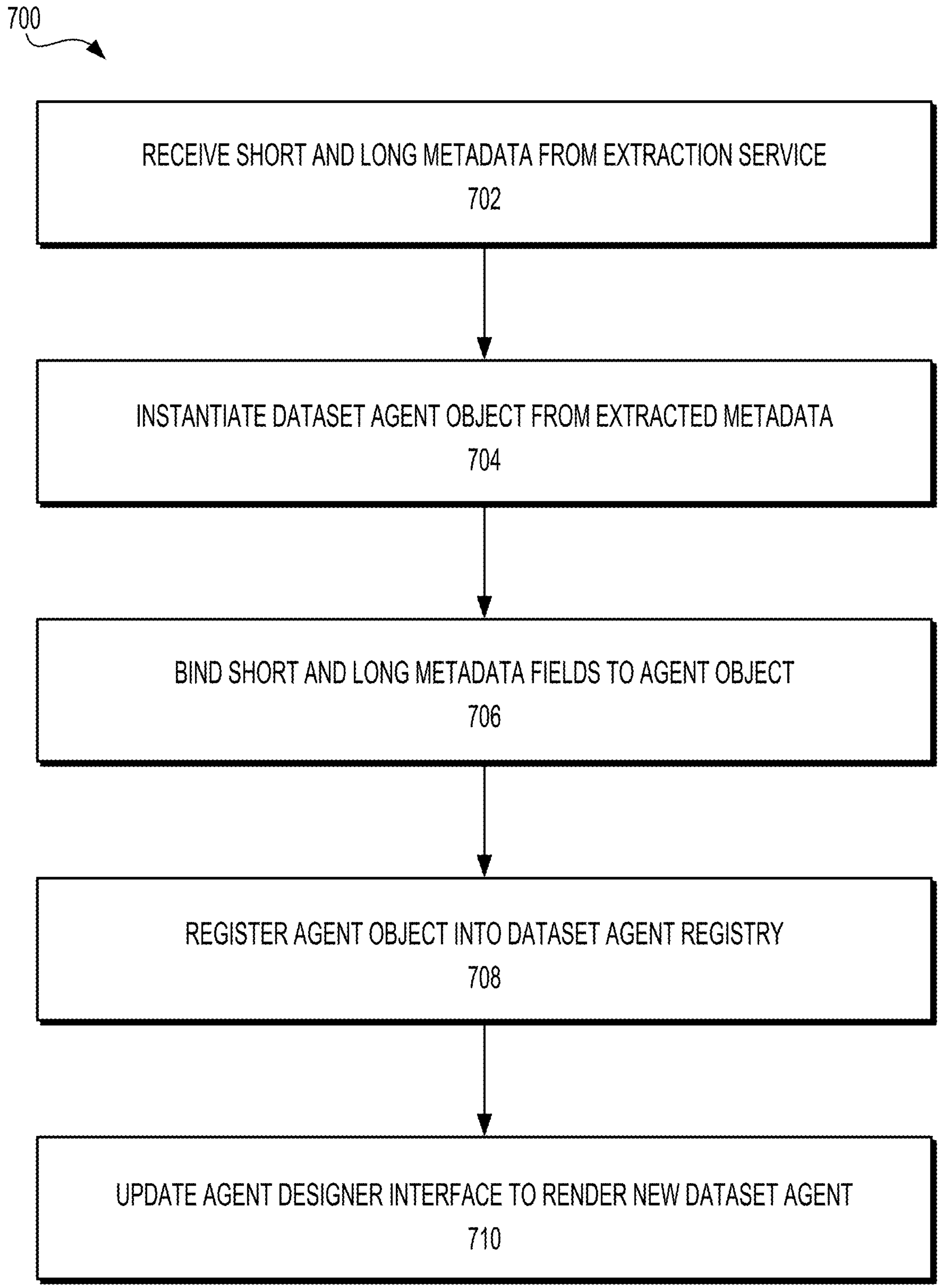
FIG. 7 depicts a method for generating a dataset agent object based on extracted metadata and registering the dataset agent object with a dataset agent registry according to an example implementation.

FIG. 7 depicts a method 700 for generating and registering a dataset agent object based on extracted metadata associated with a structured tabular data file according to an example implementation. The method 700 illustrates the operations performed by the structured data RAG platform 110 after metadata extraction has been completed, as described above with reference to FIG. 6. The method 700 includes operations for constructing a dataset agent object, binding metadata fields, registering the object, and updating the agent designer interface to render the newly registered agent. These operations enable semantic accessibility and integration of structured tabular data within downstream workflows, facilitating retrieval-augmented generation and other intelligent data interactions. The method 700 can be performed by components of the dataset agent generator 116 and the agent designer 126 of the structured data RAG platform 110, but can also be performed by other computing systems capable of metadata-driven agent generation.

At block 702, the method 700 includes receiving short metadata and long metadata. This marks the beginning of dataset agent construction using previously generated metadata artifacts. Block 702 can include the dataset agent generator 116 retrieving the extracted short metadata 136A and long metadata 136B from the data store 130, where the short metadata 136A and the long metadata 136B was stored following the operations described in FIG. 6. The dataset agent generator 116 can also retrieve the short metadata 136A and long metadata 136B directly from the metadata extraction service 114 in other cases. The short metadata 136A includes structural descriptors such as column names, data types, nullability flags, and summary statistics. The long metadata 136B includes semantically enriched descriptors, such as inferred inter-column relationships, value distributions, and annotations derived through heuristic or model-based analysis. The agent object builder 230 prepares this metadata for use in constructing the dataset agent object 240, ensuring that both structural and semantic attributes are available for the downstream binding and registration steps.

At block 704, the method 700 includes constructing a dataset agent object using the retrieved metadata. Block 704 can include the agent object builder 230 synthesizing the short metadata 136A and long metadata 136B into a unified, structured agent representation or dataset agent object, such as the dataset agent object 240. The dataset agent object 240 serves as a semantic and callable abstraction of the underlying structured tabular data 132A. Constructing the dataset agent object includes defining internal schema representation, assigning semantic roles and data annotations, and embedding contextual information derived during metadata extraction. The resulting agent object is instantiated in a platform-compatible format that supports integration into semantic workflows, natural language querying, and dynamic workflow composition via the agent designer 126.

At block 706, the method 700 includes binding metadata fields to the dataset agent object. This binding can be performed by the interface mapper 232 of the dataset agent generator 116 and integrates both short metadata 136A and long metadata 136B into the internal data structures of the dataset agent object 240. The binding operation includes mapping schema-level elements, semantic labels, statistical summaries, and inferred inter-column relationships into corresponding fields within the agent object. By embedding this metadata contextually, the dataset agent object becomes capable of supporting downstream operations such as structured query generation, semantic validation, and execution planning. The metadata binding ensures that the agent object maintains a coherent and enriched view of the ingested dataset, facilitating accurate, context-aware behavior during runtime interactions.

At block 708, the method 700 includes registering the dataset agent object into the dataset agent registry. Block 708 can include the agent registrar 236 of the dataset agent generator 116 storing and registering the fully constructed and metadata-bound dataset agent object 240 into the dataset agent registry 138 of the structured data RAG platform 110. The registration operation includes assigning a unique identifier or handle to the agent object, storing references to the associated structured tabular data 132, and indexing key metadata fields to support discoverability. The agent registrar 236 can also generate a registration message or event to signal completion of the registration, making the new dataset agent object 240 available for use by downstream services. This registration step ensures that the dataset agent object 240 is stored in a centralized, queryable repository and becomes accessible to other components of the platform, including the agent designer 126 and the workflow execution engine 124.

At block 710, the method 700 includes surfacing the registered dataset agent object through the GUI for workflow composition. Block 710 can include the development interface generator 250 of the agent designer 126 updating the GUI 184 on the client device 180 to surface and reflect the registration of the newly created dataset agent object 240. This update can involve rendering the dataset agent object 240 as a selectable and connectable node within a graphical workflow canvas or agent toolbox displayed in the GUI 184. The node can include visual indicators, metadata summaries, or interaction affordances that allow users to incorporate the dataset agent object 240 into executable workflows. By surfacing the dataset agent object 240 through the GUI 184, the structured data RAG platform 110 enables semantic composition of workflows using newly ingested and semantically enriched structured tabular data. This step marks the completion of the ingestion-to-registration pipeline and transitions the dataset agent object into the design and orchestration phases of workflow construction.

Figure 8:
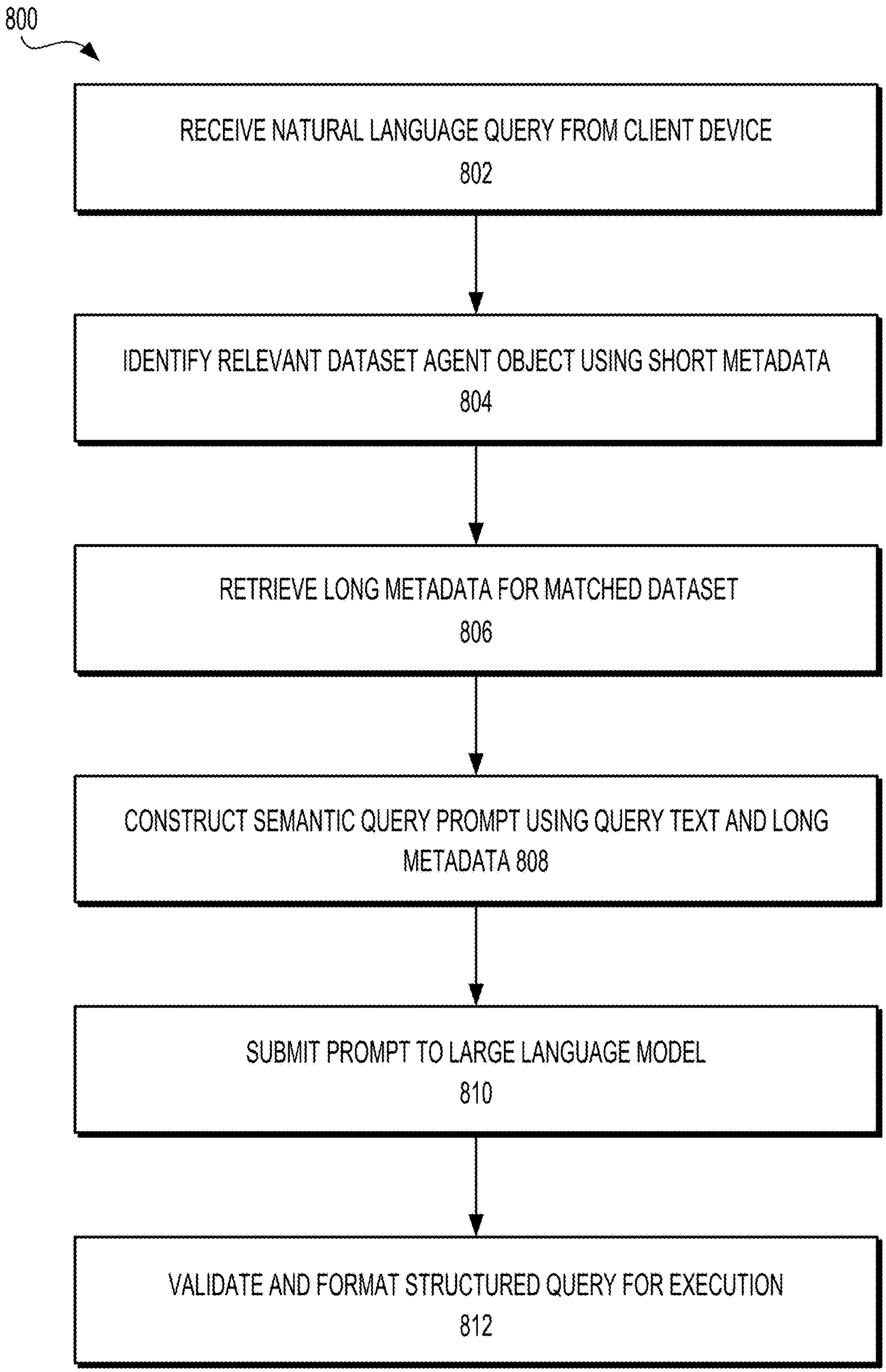
FIG. 8 depicts a method for surfacing a registered dataset agent object through a graphical user interface for workflow construction according to an example implementation.

FIG. 8 depicts a method 800 for generating a structured query from a natural language query using metadata-enriched dataset agent objects in a structured data RAG platform 110 according to an example implementation. The method 800 can be performed by one or more computing components of the structured data RAG platform 110 within the environment 10 shown in FIG. 1. The method 800 illustrates how a natural language query received from a client device 180 is semantically matched to a registered dataset agent object, enriched with long metadata, and transformed into a structured query through prompt-based interaction with an LLM. As shown in FIG. 8, the structured query is validated and formatted for execution. This process enables non-technical users to interact with tabular data using natural language interfaces and receive structured query results with minimal technical input, thereby improving accessibility and interpretability of structured datasets.

At block 802, the method 800 includes receiving a natural language query from the client device. The natural language query can be submitted by a user through the GUI 184 rendered on the client device 180. The query can be expressed in natural language syntax (e.g., English or another supported language) and can pertain to tabular data previously ingested into the structured data RAG platform 110. The natural language query can be received via a text input interface rendered by the agent designer 126, or via another application interface or API supported by the structured data RAG platform 110. The query can include user requests for information such as "Show the average revenue by region for 2022," or "List the top 5 performing products by sales volume." The structured data RAG platform 110 parses and logs the natural language query for semantic interpretation in subsequent blocks.

At block 804, the method 800 includes identifying a relevant dataset agent object using the short metadata. The structured data RAG platform 110 performs a semantic and structural comparison of the received natural language query against the indexed short metadata 136A associated with registered dataset agent objects stored in the dataset agent registry 138. The short metadata 136A can include field names, data types, schema labels, and high-level statistical summaries, which are indexed to support fast retrieval. Matching can be based on keyword similarity, column label alignment, data category correlation, or predefined metadata tags. The platform determines which dataset agent object most closely aligns with the semantics of the user's query, and selects the corresponding dataset agent object for further processing in the workflow.

At block 806, the method 800 includes retrieving long metadata for the matched dataset. Once a relevant dataset agent object has been identified based on short metadata, the structured data RAG platform 110 accesses the associated long metadata 136B from the data store 130. The long metadata 136B provides a deeper semantic and statistical profile of the underlying structured dataset, including inferred data descriptions, inter-column relationships, distributional characteristics, example values, and heuristic insights. This detailed metadata is retrieved to serve as contextual grounding material for query interpretation and structured query generation in subsequent steps. This step ensures that the structured query generation process has access to contextual signals that go beyond surface schema attributes, enabling more accurate semantic interpretation by the language model.

At block 808, the method 800 includes constructing a semantic query prompt using the natural language query and the retrieved long metadata. The structured data RAG platform 110 combines the user-provided query text with the semantically rich metadata retrieved in block 806 to construct a formatted prompt suitable for input to an LLM. The constructed prompt can embed schema information, data distribution summaries, semantic annotations, and representative examples alongside the query of a user to increase the accuracy and relevance of the resulting structured query. The prompt can be formatted according to predefined templates or prompt engineering strategies tailored for LLMs that support structured query generation, such as SQL. This prompt construction process ensures that the LLM has full contextual awareness of the target dataset's structure and meaning when interpreting the user query.

At block 810, the method 800 includes generating a structured query using a language model based on the constructed prompt. The structured data RAG platform 110 can invoke a language model, such as an internal transformer-based model or a third-party large language model, to process the structured query prompt generated in block 808. The language model can be a fine-tuned transformer model trained on structured query examples paired with tabular metadata, allowing the language model to generate domain-appropriate queries with higher precision. The model can be pre-configured or dynamically selected based on the data domain, schema complexity, or query history. In response, the language model outputs a candidate structured query, such as a SQL statement, which is semantically aligned with the user's natural language query and consistent with the schema and metadata context of the target dataset. This generated query is intended to retrieve relevant data or perform operations against the structured tabular data 132A represented by the dataset agent object 240. The structured query is retained for subsequent validation and execution steps. In some implementations, the platform can use RAG techniques to supplement the prompt with real-time samples or metadata snippets dynamically retrieved from the data store.

At block 812, the method 800 includes validating the structured query based on metadata and schema context. Block 812 can include the structured data RAG platform 110 performing a multi-stage validation of the structured query generated in block 810. This validation leverages the short metadata 136A and long metadata 136B previously extracted for the dataset agent object 240. The validation process can include syntactic checks (e.g., SQL grammar verification), schema compliance verification (e.g., confirming column references exist and data types match), and logical constraint assessments (e.g., detecting potentially unsafe or non-performant queries). The validation engine can also apply guardrails or security filers or apply rule-based corrections to the structured query. If the query fails validation, the platform can regenerate a revised prompt or structured query. If the query is successfully validated, the query is passed forward for execution in block 814.

FIG. 9 depicts a method 900 for processing, packaging, and routing the results of a structured query executed by the structured data RAG platform 110 according to an example implementation. The method 900 continues from the structured query execution workflow previously described with reference to FIG. 8, and illustrates the post-execution stages of structured result delivery, including trace packaging, downstream routing, and GUI rendering for user awareness. The method 900 can be executed by components of the structured data RAG platform 110, such as the workflow execution engine 124, in coordination with the agent designer 126 and GUI 184 rendered on the client device 180. The steps shown in FIG. 9 describe how the results from a structured query are formatted for downstream compatibility, transmitted to other agent objects in the graphical workflow canvas, and visually surfaced in the interface for user awareness and interaction.

At block 902, the method 900 includes receiving a structured query result from the execution engine. The workflow execution engine 124, having completed execution of a structured query derived from a natural language input (as described in FIG. 8), returns the query output as a structured result set suitable for downstream consumption and traceability. This result set can include tabular data in formats such as JSON, CSV, or SQL result objects, depending on the execution context and query parameters. The structured result is delivered internally to downstream components of the structured data RAG platform 110 for further handling.

At block 904, the method 900 includes packaging the query result with associated agent trace metadata. The structured query result received from the workflow execution engine 124 is bundled with execution context data, such as the identifier of the dataset agent object that processed the query, any relevant metadata (e.g., timestamp, schema version), and the execution trace representing the agent path and processing context that produced the result. This packaging step ensures traceability and supports downstream agents in understanding the provenance and semantic context of the result. The packaged result can be serialized into an internal data structure for compatibility with subsequent workflow operations.

At block 906, the method 900 includes formatting the output package for downstream agent compatibility. This operation can be performed by the workflow execution engine 124, which transforms the structured query result and associated metadata are transformed into a standardized schema or exchange format suitable for consumption by other agent objects in the workflow and aligned with expected input structures of downstream agent objects. Formatting can include converting the result into a tabular payload, JSON structure, CSV format, or another agreed-upon representation. Additionally, this block can involve applying type annotations, aligning data keys with downstream schema expectations, and embedding compatibility flags or signals that guide further processing by downstream agent objects registered within the workflow canvas.

At block 908, the method 900 includes routing the output to the next agent object in the workflow canvas. Based on the execution graph defined by the workflow, the workflow execution engine 124 transmits the formatted output package to one or more downstream agent objects that are logically connected in the workflow canvas. These agent objects can include transformers, visualizers, export utilities, or additional processing agents. The routing step can leverage internal messaging protocols or runtime orchestration logic within the workflow execution engine 124 to ensure that the output package reaches the intended recipients with minimal latency and preserved context.

At block 910, the method 900 includes updating the GUI to display the structured query result and propagate workflow feedback. The agent designer 126 coordinates with the workflow execution engine 124 to render the structured result set and a trace context of the structured result set in the graphical workflow canvas presented through the GUI 184. Visual components can include result tables, query status indicators, trace summaries, or interactive widgets for further refinement. Execution traces and runtime metrics can also be logged to the data store 130 and indexed within execution telemetry records 146 to support debugging, auditing, and performance analysis.

The computing systems in the networked operating environment 10 shown in FIG. 1, such as the computing environment 100, the client device 180, and the external database service 190, can be embodied by one or more computing devices or systems, each of which can be communicatively coupled in the networked operating environment 10 by the network 170 for data communication between them. Certain systems, devices, components, modules, and/or services described herein can be implemented, at least in part, by one or more of the computing devices or systems in the networked operating environment 10.

Examples of the computing devices or systems to implement the computing environment 100, the client device 180, and the external database service 190 include one or more processing units, memory devices, one or more user interface devices, one or more input/output ("I/O") devices, and one or more network devices, each of which can be operatively connected to a system bus. The system bus can enable bi-directional communication between the processing units, the memory, the user interface devices, the I/O devices, the network devices, other components of the computer system, combinations thereof, and the like.

The processing units can implemented as one or more central processing units (CPUs) that performs arithmetic and logical operations, one or more application specific integrated circuits (ASICs), one or more graphics processing unit (GPUs), programmable logic devices (e.g., field-programmable gate array (FPGAs), programmable logic controllers (PLCs), programmable gate arrays, or other types of processors known to those skilled in the art and suitable for controlling the operations of the systems described herein.

The memory devices can be implemented as magnetic disk drives, optical discs and disk drives, magnetic cassettes and tapes, and other magnetic storage devices, solid state memory devices, such as random access memory (RAM), read-only memory (ROM), erasable programmable ROM (EPROM), electrically erasable programmable ROM (EEPROM), flash memory, and other solid memory technologies, and other memory devices and mediums used to store data and executable code. The data stored in the memory devices can be accessed by the processing units over a system bus. The memory can be operatively connected to a memory controller that enables communication with the processing units over the system bus. Among other executable and non-executable data, the memory devices can store an operating system, data, and program modules.

The modules of the computing environment 100, such as those in the RAG platform 110, can include software, program, and related modules to perform the various operations described herein. The program modules and/or other programs can be embodied in computer-readable instructions that, when executed by the processing unit, perform various operations such as those described herein. The program modules can also be embodied in hardware, software, firmware, or any combination thereof.

Computer-readable storage media, such as the memory devices described herein, can be embodied as volatile memory, non-volatile memory, removable memory, non-removable memory, and related media devices implemented in any technology format for the storage of data or information, such as computer-readable instructions, data structures, program modules, or other data. The computer-readable storage media include, but are not limited to, RAM, ROM, EPROM, EEPROM, flash memory and other solid state memory technologies, optical, and other optical storage, magnetic cassettes, magnetic tape, magnetic disk storage or other magnetic storage devices, or any other medium which can be used to store data and executable code which can be accessed by the computer system.

The user interface devices can include one or more devices, such as display devices, with which a user accesses the computer system and the program modules. The I/O devices enable a user to interface with the computer system and the program modules. In one embodiment, the I/O devices are operatively connected to an I/O controller that enables communication with the processing unit over the system bus. The I/O devices can include one or more input devices, such as, but not limited to, a keyboard, a mouse, or an electronic stylus. Further, the I/O devices can include one or more output devices, such as, but not limited to, a display screen or a printer.

In some implementations, the computing environment 100 described above with reference to FIG. 1 can be implemented in a cloud computing environment. The cloud computing environment can include a hardware resource layer, a virtualization/control layer, and a virtual resource layer, among possibly other components.

The cloud computing environment can be deployed in a variety of different ways. The deployment options allow users of the structured data RAG platform 110, for example, to tailor the operational and control aspects of the structured data RAG platform 110 based on privacy, governance, and performance needs and concerns. In a first deployment configuration, the cloud computing environment can be hosted as a multi-tenant public cloud environment by a platform provider, and the structured data RAG platform 110 can be hosted entirely within the multitenant public cloud environment as a software-as-a-service (SaaS) offering. In this configuration, all components of the structured data RAG platform 110 can be managed in the public cloud environment, and users interact with the structured data RAG platform 110 through secure internet-based endpoints. The compute and data storage partitions of the cloud computing environment can be tenant-aware and logically isolated for the structured data RAG platform 110 in that case, and user access to the structured data RAG platform 110 can be provided through a platform gateway using secure domain routing (e.g., through a domain name service (DNS) such as CloudFlare®).

In a second deployment configuration, the cloud computing environment can be hosted as an off-premises private or dedicated cloud environment, provisioned exclusively for the structured data RAG platform 110. Such a dedicated instance retains the architectural structure of the SaaS model but with isolated compute resources. This deployment configuration provides the benefits of managed services while enhancing data residency and isolation. In a third deployment configuration, the cloud computing environment can be hosted using a hybrid model that bridges on-premises or private infrastructure with off-premises remote services hosted by a platform provider. In this scenario, core data and application services may reside within on-premises compute infrastructure, while other platform functions can be hosted and accessed remotely over secure cloud connectors. This deployment option can achieve sovereignty over sensitive data while utilizing cloud-native capabilities, such as scalable compute fabric hosting.

In a fourth deployment configuration, the cloud computing environment can be hosted entirely as an on-premises private or dedicated cloud environment, provisioned exclusively for the structured data RAG platform 110. All infrastructure components, AI models, orchestration systems, and developer interfaces are provisioned using the on-premises computer tenancy in that case, providing maximum control over data, infrastructure, and integration. This option supports clients with advanced internal IT operations, heightened compliance obligations, and related concerns. Other deployment configurations and combinations of deployment configurations are also within the scope of the embodiments.

The hardware resource layer of the cloud computing environment can provide hardware resources, such as compute resources, memory resources, and other resources. The compute resources can include one or more hardware components that perform computations to process data, and/or to execute computer-executable instructions of one or more application programs, operating systems, and/or other software. The compute resources can include one or more CPUs configured with one or more processing cores. The compute resources can include one or more GPUs configured to accelerate operations performed by one or more CPUs, and/or to perform computations to process data, and/or to execute computer-executable instructions of one or more application programs, operating systems, and/or other software. In some implementations, the compute resources can include one or more discrete GPUs. In some other implementations, the compute resources can include CPU and GPU components that are configured in accordance with a co-processing CPU/GPU computing model, wherein the sequential part of an application executes on the CPU and the computationally intensive part is accelerated by the GPU.

The compute resources can include one or more system-on-chip (SoC) components along with one or more other components, including, for example, one or more of the memory resources, and/or one or more of the other resources. The compute resources can be or can include one or more hardware components architected in accordance with an ARM® architecture. Alternatively, the compute resources can be or can include one or more hardware components architected in accordance with an x86 architecture. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources can include one or more hardware components that perform storage operations, including temporary or permanent storage operations. In some embodiments, the memory resources include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technologies, CD-ROM, DVD, or other optical storage, magnetic cassettes, magnetic tape, magnetic disk storage or other magnetic storage devices, or any other medium which can be used to store data and which can be accessed by the compute resources.

The other resources can include any other hardware resources that can be utilized by the compute resources, the memory resources, or both to perform operations described herein. The other resources can include one or more input and/or output processors (e.g., network interface controller or wireless radio), one or more modems, one or more codec chipset, one or more pipeline processors, one or more fast Fourier transform (FFT) processors, one or more digital signal processors (DSPs), one or more speech synthesizers, and/or the like.

The hardware resources operating within the hardware resources layer can be virtualized by one or more virtual machine monitors (VMMs) (also known as "hypervisors") operating within the virtualization/control layer to manage one or more virtual resources that reside in the virtual resource layer. The VMMs can be or can include software, firmware, and/or hardware that alone or in combination with other software, firmware, and/or hardware, manages one or more virtual resources operating within the virtual resource layer.

The virtual resources operating within the virtual resource layer can include abstractions of at least a portion of the compute resources, the memory resources, the other resources, or any combination thereof. These abstractions are referred to herein as virtual machines (VMs). Each of the VMs can execute one or more applications.

The flowcharts and sequence diagrams of FIGS. 5A, 5B, and 6-9 illustrate the functionality and operation of methods implemented within the environment 10. If embodied in software, each block in these flowcharts can represent a module, segment, or portion of code including program instructions to implement the specified logical function(s). The program instructions can be embodied as source code, written in human-readable programming languages such as Python®, Java®, or C++, or as machine code including numerical instructions executable by one or more processors. The machine code can be compiled or converted from the source code or other high-level programming languages. If embodied in hardware, each block can represent a circuit or a set of interconnected circuits to implement the specified logical function(s).

Although the flowcharts and sequence diagrams of FIGS. 5A, 5B, and 6-9 depict a specific order of execution, the execution order can vary in alternative implementations. For example, the sequence of execution for two or more blocks can differ or be rearranged relative to the order shown. Additionally, two or more blocks are shown consecutively in FIGS. 5A, 5B, and 6-9 can be executed concurrently or partially concurrently. Furthermore, in some implementations, one or more blocks shown in FIGS. 5A, 5B and 6-9 can be omitted or skipped entirely. Any such variations, including the addition of counters, state variables, warning semaphores, or troubleshooting messages for enhanced utility, performance measurement, or system monitoring, are understood to fall within the scope of the present disclosure.

Any logic or application described can be embodied in a non-transitory computer-readable medium for use by or in connection with an instruction execution system such as the computer system or the cloud computing environment described above, as examples. In this context, the logic can include instructions and declarations that can be retrieved from the computer-readable medium and executed by the instruction execution system.

The computer-readable medium can include a variety of physical media, such as magnetic, optical, or semiconductor media. Specific examples of suitable computer-readable media include magnetic tapes, magnetic floppy diskettes, magnetic hard drives, memory cards, solid-state drives (SSDs), universal serial bus (USB) flash drives, and optical discs such as compact discs (CDs) or digital versatile discs (DVDs). The medium can also include random access memory (RAM), such as static random access memory (SRAM) or dynamic random access memory (DRAM), and other volatile memory. Nonvolatile memory, such as magnetic random access memory (MRAM), read-only memory (ROM), programmable read-only memory (PROM), erasable programmable read-only memory (EPROM), and electrically erasable programmable read-only memory (EEPROM), are also suitable computer-readable media.

The logic or applications described herein can be implemented and structured in various ways. For instance, one or more modules can be implemented as components of a single application. Alternatively, one or more modules can execute in shared or separate computer systems or as part of a cloud computing environment. For example, multiple modules can execute within the same computer system or across different systems and/or devices connected over the system bus and/or one or more networks, such as the network 170.

Combinatorial language, such as "at least one of X, Y, and Z" or "at least one of X, Y, or Z," unless indicated otherwise, is used in general to identify one, a combination of any two, or all three (or more if a larger group is identified) thereof, such as X and only X, Y and only Y, and Z and only Z, the combinations of X and Y, X and Z, and Y and Z, and all of X, Y, and Z. Such combinatorial language is not generally intended to, and unless specified does not, identify or require at least one of X, at least one of Y, and at least one of Z to be included.

The above-described embodiments of the present disclosure are merely examples of implementations to provide a clear understanding of the principles of the present disclosure. Many variations and modifications can be made to the above-described embodiments without departing substantially from the spirit and principles of the disclosure. In addition, components and features described with respect to one implementation can be included in another implementation. All such modifications and variations are intended to be included herein within the scope of this disclosure.

Therefore, the following is claimed:

1. A computer-implemented method for retrieving structured data in a retrieval-augmented generation (RAG) platform, the method comprising:

extracting metadata from a tabular file comprising structured data, the metadata comprising short metadata and long metadata;

generating, for the tabular file, a dataset agent object using the metadata;

receiving a natural language query through a query agent object;

identifying the dataset agent object using a metadata filtering rule based at least in part on the natural language query and the short metadata;

generating a structured query based on the natural language query and the long metadata, the structured query conforming to structured query language syntax and comprising query constraints derived from the short metadata; and executing the structured query on the structured data associated with the dataset agent object.

2. The computer-implemented method of claim 1, further comprising:

associating a human-readable description with the structured data; and storing the dataset agent object and the metadata in a metadata index.

3. The computer-implemented method of claim 2, further comprising applying a language model prompt to a subset of the structured data to generate the human-readable description, the language model prompt being configured to produce a human-readable, natural language summary describing the structured data.

4. The computer-implemented method of claim 2, wherein the metadata index associates the dataset agent object with a unique identifier and one or more access control policies.

5. The computer-implemented method of claim 1, further comprising:

generating a response comprising a result set produced by the structured query and an identifier of the dataset agent object used; and transmitting the response to a downstream agent object among a plurality of interconnected agent objects within a workflow canvas for further processing.

6. The computer-implemented method of claim 5, wherein the response further comprises a metadata field indicating an execution time and a number of rows returned.

7. The computer-implemented method of claim 5, wherein the workflow canvas comprises a graphical interface that allows a user to visually arrange the plurality of interconnected agent objects.

8. The computer-implemented method of claim 5, wherein the downstream agent object invokes a tool selected from a set of tools comprising a visualization tool, a document generator, and an export utility.

9. The computer-implemented method of claim 1, wherein:

the short metadata comprises at least a file name, a table label, and column headers; and the long metadata comprises column data types, nullability, minimum values, maximum values, enumerated values, and row-level security attributes.

10. The computer-implemented method of claim 1, wherein executing the structured query comprises performing a join operation across the structured data associated with multiple dataset agent objects based at least in part on metadata relationships between the multiple dataset agent objects stored in a metadata index.

11. The computer-implemented method of claim 1, wherein the metadata filtering rule comprises a semantic similarity computation between the natural language query and at least one column header in the short metadata.

12. The computer-implemented method of claim 1, wherein identifying the dataset agent object further comprises scoring multiple candidate agent objects and selecting a candidate agent object with a highest semantic match score among the multiple candidate agent objects as the dataset agent object.

13. The computer-implemented method of claim 1, wherein generating the structured query comprises formatting the structured query with column aliases corresponding to column headers included in the short metadata.

14. The computer-implemented method of claim 1, wherein the structured query comprises only supported functions and syntax constraints corresponding to a target database type.

15. The computer-implemented method of claim 1, wherein executing the structured query comprises transmitting the structured query to a query service and receiving a result set via a structured application programming interface (API) response.

16. The computer-implemented method of claim 1, wherein:

generating the structured query comprises generating the structured query using a large language model; and the large language model is a fine-tuned model specialized for structured query generation based on metadata inputs.

17. The computer-implemented method of claim 1, wherein the tabular file comprises a spreadsheet file having one or more worksheets, and each worksheet of the one or more worksheets is treated as a distinct dataset agent object.

18. The computer-implemented method of claim 1, wherein identifying the dataset agent object comprises resolving synonym mappings between user query terms and column names in the short metadata.

19. A system for retrieving structured data in a retrieval-augmented generation (RAG) platform, the system comprising:

one or more processors; and a memory storing instructions that, when executed by the one or more processors, cause the one or more processors to:

extract metadata from a tabular file comprising structured data, the metadata comprising short metadata and long metadata;

generate, for the tabular file, a dataset agent object using the metadata;

receive a natural language query through a query agent object;

identify the dataset agent object using a metadata filtering rule based at least in part on the natural language query and the short metadata;

generate a structured query based on the natural language query and the long metadata, the structured query conforming to structured query language syntax and comprising query constraints derived from the short metadata; and execute the structured query on the structured data associated with the dataset agent object.

20. A non-transitory computer-readable medium storing instructions that, when executed by one or more processors, cause the one or more processors to:

extract metadata from a tabular file comprising structured data, the metadata comprising short metadata and long metadata;

generate, for the tabular file, a dataset agent object using the metadata;

receive a natural language query through a query agent object;

identify the dataset agent object using a metadata filtering rule based at least in part on the natural language query and the short metadata;

generate a structured query based on the natural language query and the long metadata, the structured query conforming to structured query language syntax and comprising query constraints derived from the short metadata; and execute the structured query on the structured data associated with the dataset agent object.

* * * * *